(12) United States Patent
Ohno et al.

(10) Patent No.: US 9,599,239 B2
(45) Date of Patent: Mar. 21, 2017

(54) SELECTOR VALVE AND COOLING SYSTEM

(75) Inventors: Yuichi Ohno, Nishio (JP); Kazuhide Uchida, Hamamatsu (JP); Yuki Jojima, Nagoya (JP); Yoshiaki Kawakami, Nagoya (JP); Eizo Takahashi, Chiryu (JP); Kousuke Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 377 days.

(21) Appl. No.: 14/342,921

(22) PCT Filed: Sep. 5, 2012

(86) PCT No.: PCT/IB2012/001711
§ 371 (c)(1),
(2), (4) Date: Apr. 11, 2014

(87) PCT Pub. No.: WO2013/034967
PCT Pub. Date: Mar. 14, 2013

(65) Prior Publication Data
US 2014/0238073 A1 Aug. 28, 2014

(30) Foreign Application Priority Data
Sep. 6, 2011 (JP) .................................. 2011-193859

(51) Int. Cl.
*F25B 39/02* (2006.01)
*F16K 11/085* (2006.01)
(Continued)

(52) U.S. Cl.
CPC ........ *F16K 11/085* (2013.01); *B60H 1/00485* (2013.01); *F16K 11/0856* (2013.01);
(Continued)

(58) Field of Classification Search
CPC ............ B60H 1/00485; B60H 1/00278; B60H 2001/00949; B60H 1/00885; B60H 1/23;
(Continued)

(56) References Cited

U.S. PATENT DOCUMENTS 3,865,139 A * 2/1975 Tolnai .................... F16K 5/0471
137/625.19
5,878,589 A * 3/1999 Tanaka ............... B60H 1/00007
165/80.2

FOREIGN PATENT DOCUMENTS

JP   A-06-194007   7/1994
JP   H11190444 A   7/1999
(Continued)

OTHER PUBLICATIONS

Dec. 17, 2014 Office Action issued in Japanese Application No. 2011-193859.

*Primary Examiner* — Elizabeth Martin
(74) *Attorney, Agent, or Firm* — Oliff PLC

(57) ABSTRACT

A selector valve includes: a first valve element having a through-hole; a first housing having a radial hole through which fluid flowing though the through-hole passes, the first housing accommodating the first valve element; a second valve element having a through-hole; a second housing having radial holes through which fluid flowing through the through-hole passes, the second housing accommodating the second valve element; and a motor configured to integrally actuate the first valve element and the second valve element. A hollow space configured to suppress transfer of heat between the first valve element and the second valve element is formed between the first valve element and the second valve element. A hollow space configured to suppress transfer of heat between the first housing and the second housing is formed between the first housing and the second housing.

9 Claims, 11 Drawing Sheets

(51) Int. Cl.
*F25B 41/04* (2006.01)
*B60H 1/00* (2006.01)
*F25B 23/00* (2006.01)
*F25D 19/00* (2006.01)

(52) U.S. Cl.
CPC ............ *F25B 41/04* (2013.01); *F25B 23/006* (2013.01); *F25B 2400/23* (2013.01); *F25D 19/00* (2013.01); *Y10T 137/86871* (2015.04)

(58) Field of Classification Search
CPC ... B60H 2001/3288; F25B 41/04; F16K 3/26; F16K 31/0613
See application file for complete search history.

(56) References Cited

FOREIGN PATENT DOCUMENTS

| | | |
|---|---|---|
| JP | A-2000-073763 | 3/2000 |
| JP | A-2005-090862 | 4/2005 |
| JP | A-2007-069733 | 3/2007 |
| JP | 4032014 Y | 1/2015 |

\* cited by examiner

| MODE | VALVE 57 | VALVE 58 |
|---|---|---|
| AIR CONDITIONER OPERATION MODE | GAS-LIQUID SEPARATOR 40 TO HEAT EXCHANGER 15 | COOLING PORTION 30 TO HEAT EXCHANGER 15 |
| HEAT PIPE OPERATION MODE | CLOSED | COOLING PORTION 30 TO HEAT EXCHANGER 14 |

F I G . 7
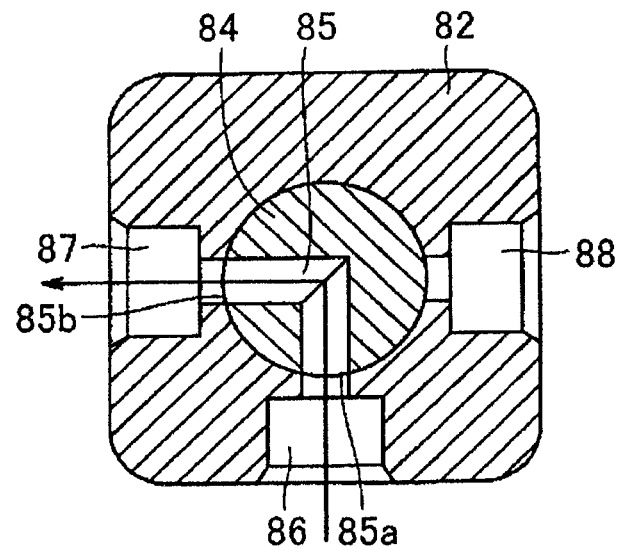
F I G . 8
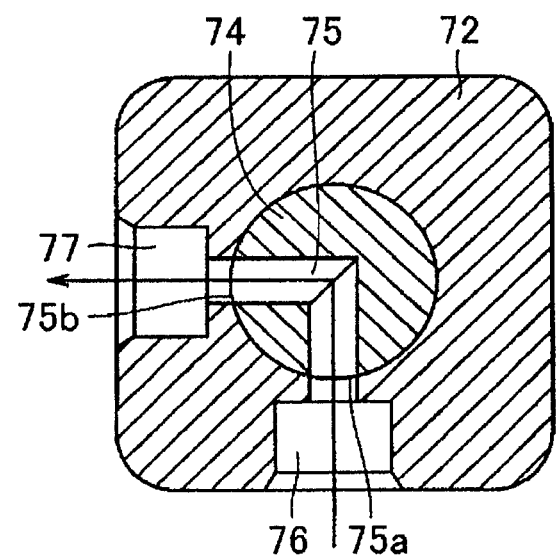

SELECTOR VALVE AND COOLING SYSTEM

BACKGROUND OF THE INVENTION

1. Field of the Invention

The invention relates to a selector valve and a cooling system and, more particularly, to a selector valve that switches a flow passage of fluid and a cooling system that includes the selector valve.

2. Description of Related Art

In recent years, hybrid vehicles, fuel cell vehicles, electric vehicles, and the like, that travel with the use of driving force of a motor become a focus of attention as one of measures against environmental issues. In such vehicles, electrical devices, such as a motor, a generator, an inverter, a converter and a battery, exchange electric power to generate heat. Therefore, these electrical devices need to be cooled.

Japanese Patent Application Publication No. 2000-73763 (JP 2000-73763 A) describes a hybrid vehicle cooling system that includes a first cooling circuit that cools an engine cylinder head and a driving motor selectively or simultaneously, a second cooling circuit that cools an engine cylinder block and a third cooling circuit that cools a power control unit that executes drive control over the driving motor.

In the cooling system described in JP 2000-73763 A, as in the case of a normal vehicle that cools only an engine, a system that circulates coolant between a heat generating element and a radiator is used to cool an electrical component. In such a system, a radiator for cooling an electrical component is required to be additionally provided, so there is inconvenience that vehicle mountability is low.

Then, there has been suggested a technique that utilizes a vapor compression refrigeration cycle, which is used as a vehicle air conditioner, to cool a heat generating element. For example, Japanese Patent Application Publication No. 2005-90862 (JP 2005-90862 A) describes a cooling system in which a heat generating element cooling unit for cooling a heat generating element is provided in a bypass line that bypasses the decompressor, evaporator and compressor of an air-conditioning refrigeration cycle. Japanese Patent Application Publication No. 2007-69733 (JP 2007-69733 A) describes a system in which a heat exchanger that exchanges heat with air-conditioning air and a heat exchanger that exchanges heat with a heat generating element are arranged in parallel with each other in a refrigerant line routed from an expansion valve to a compressor and refrigerant for an air conditioner is utilized to cool the heat generating element.

On the other hand, in relation to a selector valve used to switch an operation mode of an air-conditioning system, Japanese Patent Application Publication No. 6-194007 (JP 6-194007 A) describes a configuration that a rotor having radial holes and inserted in a spool is rotated by a motor to sequentially open or close holes of the spool to thereby switch a flow passage.

In a system that is able to switch a flow passage through which fluid passes, when a plurality of control valves for switching the flow passage, the configuration of the system is complex, and there is inconvenience that the size and cost of the system increase. The selector valve described in JP 6-194007 A is formed of an integrated valve that is able to switch a plurality of valves with the use of a single drive unit. By so doing, it is intended to reduce the size and cost of the system.

However, in the selector valve described in JP 6-194007 A, both low-temperature fluid before passing through a compressor and high-temperature fluid after passing through the compressor flow through the integrated valve structure. When fluids in different temperature ranges respectively flow through different flow passages in the integrated valve structure, heat transfers from the high-temperature fluid to the low-temperature fluid. Therefore, the performance of the air-conditioning system is decreased, so there is inconvenience that power consumption is increased.

SUMMARY OF THE INVENTION

The invention provides a selector valve that is used to switch a flow passage of fluid and that is able to suppress heat exchanged between fluids flowing inside the valve while reducing the size and cost of the valve. In addition, the invention further provides a cooling system for cooling a heat generating source, which includes the selector valve to make it possible to reduce power consumption.

An aspect of the invention provides a selector valve. The selector valve includes: a first valve element having a first through-hole; a first housing having a first flow passage through which fluid flowing through the first through-hole passes, the first housing accommodating the first valve element; a second valve element having a second through-hole; a second housing having a second flow passage through which fluid flowing through the second through-hole passes, the second housing accommodating the second valve element; a drive unit configured to integrally actuate the first valve element and the second valve element; a valve element heat insulating unit provided between the first valve element and the second valve element, the valve element heat insulating unit being configured to suppress transfer of heat between the first valve element and the second valve element; and a housing heat insulating unit provided between the first housing and the second housing, the housing heat insulating unit being configured to suppress transfer of heat between the first housing and the second housing.

In the selector valve, the valve element heat insulating unit may include a hollow space formed between the first valve element and the second valve element, and the housing heat insulating unit may include a hollow space formed between the first housing and the second housing.

In the selector valve, at least one of the valve element heat insulating unit and the housing heat insulating unit may include a heat insulating material.

Another aspect of the invention provides a cooling system. The cooling system includes: a compressor configured to circulate refrigerant; a first heat exchanger configured to perform heat exchange between the refrigerant and outside air; a decompressor configured to decompress the refrigerant; a second heat exchanger configured to perform heat exchange between the refrigerant and air-conditioning air; a first line and a second line connected in parallel with each other between the first heat exchanger and the decompressor, the first line and the second line being paths of the refrigerant; a cooling portion provided on the second line, the cooling portion configured to use the refrigerant to cool a heat generating source; a third line through which the refrigerant flows between the compressor and the first heat exchanger; a communication line configured to provide fluid communication between the third line and a portion of the second line, the portion of the second line being closer to the decompressor than the cooling portion; and any one of the above-described selector valves.

With the selector valve according to the aspects of the invention, it is possible to achieve a reduction in size and cost of the valve, and it is possible to suppress heat exchange between fluids flowing inside the valve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a cross-sectional view of the selector valve, taken along the line VII-VII in FIG. 3;

FIG. 8 is a cross-sectional view of the selector valve, taken along the line VIII-VIII in FIG. 3;

DETAILED DESCRIPTION OF EMBODIMENTS

Figure 1:
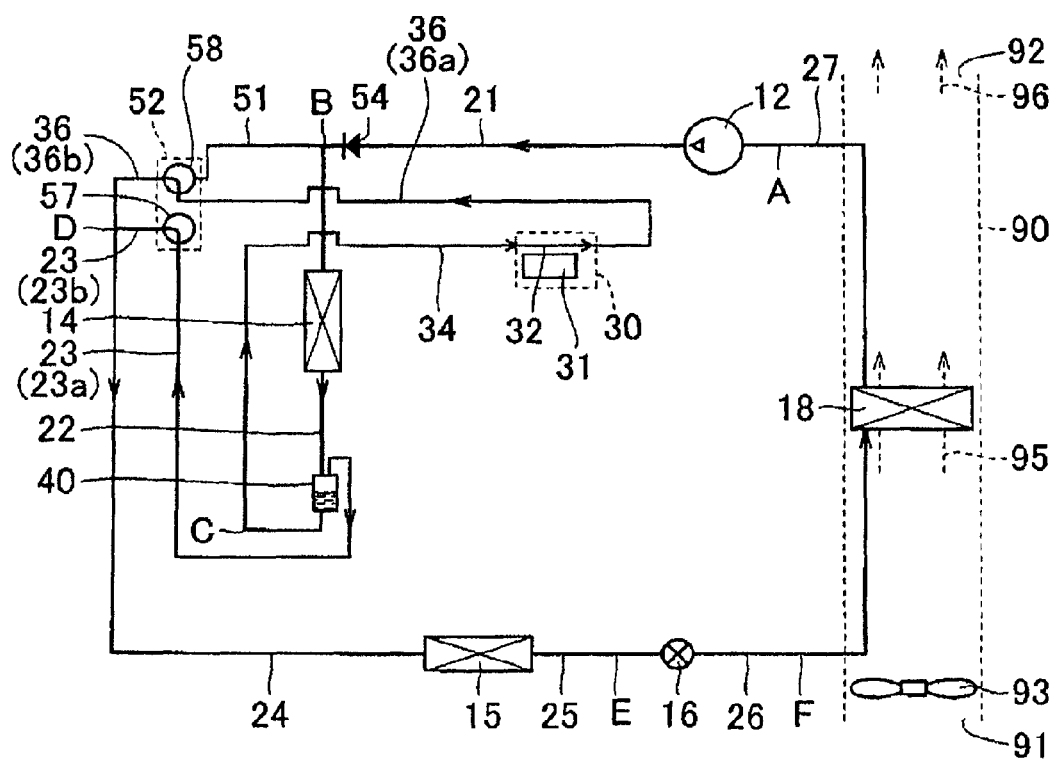
FIG. 1 is a schematic view that shows the configuration of a cooling system according to a first embodiment.

Hereinafter, embodiments of the invention will be described with reference to the accompanying drawings. Note that, in the following drawings, like reference numerals denote the same or corresponding portions and the description thereof is not repeated.

First Embodiment

FIG. 1 is a schematic view that shows the configuration of a cooling system 1 according to a first embodiment. As shown in FIG. 1, the cooling system 1 includes a vapor compression refrigeration cycle 10. The vapor compression refrigeration cycle 10 is, for example, mounted on a vehicle in order to cool the cabin of the vehicle. Cooling with the use of the vapor compression refrigeration cycle 10 is performed, for example, when a switch for cooling is turned on or when an automatic control mode in which the temperature in the cabin of the vehicle is automatically adjusted to a set temperature is selected and the temperature in the cabin is higher than the set temperature.

The vapor compression refrigeration cycle 10 includes a compressor 12, a heat exchanger 14 that serves as a first heat exchanger, a heat exchanger 15, an expansion valve 16 that is an example of a decompressor, and a heat exchanger 18 that serves as a second heat exchanger.

The compressor 12 is actuated by a motor or engine equipped for the vehicle as a power source, and adiabatically compresses refrigerant gas to obtain superheated refrigerant gas. The compressor 12 introduces and compresses gaseous refrigerant flowing from the heat exchanger 18 during operation of the vapor compression refrigeration cycle 10, and discharges high-temperature and high-pressure gaseous refrigerant to a refrigerant line 21. The compressor 12 discharges refrigerant to the refrigerant line 21 to thereby circulate refrigerant in the vapor compression refrigeration cycle 10.

The heat exchangers 14 and 15 cause superheated refrigerant gas, compressed in the compressor 12, to release heat to an external medium with a constant pressure and to become refrigerant liquid. High-pressure gaseous refrigerant discharged from the compressor 12 releases heat to the surroundings to be cooled in the heat exchangers 14 and 15 to thereby condense (liquefy). Each of the heat exchangers 14 and 15 includes tubes and fins. The tubes flow refrigerant. The fins are used to exchange heat between refrigerant flowing through the tubes and air around the heat exchanger 14 or 15. Each of the heat exchangers 14 and 15 exchanges heat between refrigerant and natural draft generated as the vehicle travels or cooling air supplied by forced draft from a cooling fan, such as an engine cooling radiator fan. Due to heat exchange in the heat exchangers 14 and 15, the temperature of refrigerant decreases, and refrigerant liquefies.

The expansion valve 16 causes high-pressure liquid refrigerant, flowing through a refrigerant line 25, to be sprayed through a small hole to expand into low-temperature and low-pressure atomized refrigerant. The expansion valve 16 decompresses refrigerant liquid, condensed in the heat exchangers 14 and 15, into wet steam in a gas-liquid mixing state. Note that a decompressor for decompressing refrigerant liquid is not limited to the expansion valve 16 that performs throttle expansion; instead, the decompressor may be a capillary tube.

Atomized refrigerant flowing inside the heat exchanger 18 vaporizes to absorb heat of ambient air that is introduced so as to contact the heat exchanger 18. The heat exchanger 18 uses low-temperature and low-pressure refrigerant decompressed by the expansion valve 16 to absorb heat of vaporization, required at the time when wet steam of refrigerant evaporates into refrigerant gas, from air-conditioning air flowing to the cabin of the vehicle to thereby cool the cabin of the vehicle. Air-conditioning air of which heat is absorbed by the heat exchanger 18 to decrease its temperature flows into the cabin of the vehicle to cool the cabin of the vehicle. Refrigerant absorbs heat from the surroundings in the heat exchanger 18 to be heated.

The heat exchanger 18 includes tubes and fins. The tubes flow refrigerant. The fins are used to exchange heat between refrigerant flowing through the tubes and air around the heat exchanger 18. Refrigerant in a wet steam state flows through the tubes. When refrigerant flows through the tubes, the refrigerant absorbs heat of air in the cabin of the vehicle as latent heat of vaporization via the fins to evaporate, and further becomes superheated steam because of sensible heat. Vaporized refrigerant flows into the compressor 12 via a refrigerant line 27. The compressor 12 compresses refrigerant flowing from the heat exchanger 18.

The vapor compression refrigeration cycle 10 further includes the refrigerant line 21, refrigerant lines 22, 23 and 24, the refrigerant line 25, a refrigerant line 26 and the refrigerant line 27. The refrigerant line 21 provides fluid communication between the compressor 12 and the heat exchanger 14, and serves as a third line. The refrigerant lines 22, 23 and 24 provide fluid communication between the heat exchanger 14 and the heat exchanger 15. The refrigerant line 25 provides fluid communication between the heat exchanger 15 and the expansion valve 16. The refrigerant line 26 provides fluid communication between the expansion valve 16 and the heat exchanger 18. The refrigerant line 27 provides fluid communication between the heat exchanger 18 and the compressor 12.

The refrigerant line 21 is a line for flowing refrigerant from the compressor 12 to the heat exchanger 14. Refrigerant flows through the refrigerant line 21 from the outlet of the compressor 12 toward the inlet of the heat exchanger 14 between the compressor 12 and the heat exchanger 14. The refrigerant lines 22 to 25 are lines for flowing refrigerant from the heat exchanger 14 to the expansion valve 16. Refrigerant flows through the refrigerant lines 22 to 25 from the outlet of the heat exchanger 14 toward the inlet of the expansion valve 16 between the heat exchanger 14 and the expansion valve 16.

The refrigerant line 26 is a line for flowing refrigerant from the expansion valve 16 to the heat exchanger 18. Refrigerant flows through the refrigerant line 26 from the outlet of the expansion valve 16 toward the inlet of the heat exchanger 18 between the expansion valve 16 and the heat exchanger 18. The refrigerant line 27 is a line for flowing refrigerant from the heat exchanger 18 to the compressor 12. Refrigerant flows through the refrigerant line 27 from the outlet of the heat exchanger 18 toward the inlet of the compressor 12 between the heat exchanger 18 and the compressor 12.

The vapor compression refrigeration cycle 10 is formed such that the compressor 12, the heat exchangers 14 and 15, the expansion valve 16 and the heat exchanger 18 are coupled by the refrigerant lines 21 to 27. Note that refrigerant used in the vapor compression refrigeration cycle 10 may be, for example, carbon dioxide, hydrocarbon, such as propane and isobutane, ammonia, chlorofluorocarbons, water, or the like.

The vapor compression refrigeration cycle 10 further includes a gas-liquid separator 40. The gas-liquid separator 40 is arranged on a path of refrigerant between the heat exchanger 14 and the expansion valve 16. The gas-liquid separator 40 separates refrigerant, flowing out from the heat exchanger 14, into gaseous refrigerant and liquid refrigerant. Refrigerant liquid that is liquid refrigerant and refrigerant steam that is gaseous refrigerant are stored inside the gas-liquid separator 40. The refrigerant lines 22 and 23 and the refrigerant line 34 are coupled to the gas-liquid separator 40.

Refrigerant is in a wet steam gas-liquid two-phase state, mixedly containing saturated liquid and saturated steam, on the outlet side of the heat exchanger 14. Refrigerant flowing out from the heat exchanger 14 is supplied to the gas-liquid separator 40 through the refrigerant line 22. Refrigerant in a gas-liquid two-phase state, flowing from the refrigerant line 22 into the gas-liquid separator 40, is separated into gas and liquid inside the gas-liquid separator 40. The gas-liquid separator 40 separates refrigerant, condensed by the heat exchanger 14, into liquid-state refrigerant liquid and gaseous refrigerant steam and temporarily stores them.

The separated refrigerant liquid flows out to the outside of the gas-liquid separator 40 via the refrigerant line 34. The end portion of the refrigerant line 34 arranged in liquid inside the gas-liquid separator 40 forms an outlet port through which liquid refrigerant flows out from the gas-liquid separator 40. The separated refrigerant steam flows out to the outside of the gas-liquid separator 40 via the refrigerant line 23. The end portion of the refrigerant line 23 arranged in gas inside the gas-liquid separator 40 forms an outlet port through which gaseous refrigerant flows out from the gas-liquid separator 40. Gaseous refrigerant steam delivered from the gas-liquid separator 40 radiates heat to the surroundings in the heat exchanger 15 to be cooled to thereby condense. The heat exchanger 15 serves as a third heat exchanger.

Inside the gas-liquid separator 40, the refrigerant liquid accumulates at the lower side and the refrigerant steam accumulates at the upper side. The end portion of the refrigerant line 34 that delivers refrigerant liquid from the gas-liquid separator 40 is coupled to the bottom portion of the gas-liquid separator 40. Only refrigerant liquid is delivered from the bottom side of the gas-liquid separator 40 to the outside of the gas-liquid separator 40 via the refrigerant line 34. The end portion of the refrigerant line 23 that delivers refrigerant steam from the gas-liquid separator 40 is coupled to the ceiling portion of the gas-liquid separator 40. Only refrigerant steam is delivered from the ceiling side of the gas-liquid separator 40 to the outside of the gas-liquid separator 40 via the refrigerant line 23. By so doing, the gas-liquid separator 40 is able to reliably separate gaseous refrigerant and liquid refrigerant from each other.

The path through which refrigerant flows from the outlet of the heat exchanger 14 toward the inlet of the expansion valve 16 includes the refrigerant line 22, the refrigerant line 23, the refrigerant line 24 and the refrigerant line 25. The refrigerant line 22 is routed from the outlet side of the heat exchanger 14 to the gas-liquid separator 40. The refrigerant line 23 flows out refrigerant steam from the gas-liquid separator 40. The refrigerant line 24 is coupled to the inlet side of the heat exchanger 15. The refrigerant line 25 flows refrigerant from the outlet side of the heat exchanger 15 to the expansion valve 16. Gaseous refrigerant separated in the gas-liquid separator 40 flows through the refrigerant line 23 that serves as a first line.

The path of refrigerant that flows between the heat exchanger 14 and the heat exchanger 15 includes the refrigerant line 34 and a refrigerant line 36. The refrigerant line 34 provides fluid communication between the gas-liquid separator 40 and the cooling portion 30. The refrigerant line 36 provides fluid communication between the cooling portion 30 and the refrigerant line 24. Refrigerant liquid flows from the gas-liquid separator 40 to the cooling portion 30 via the refrigerant line 34. Refrigerant passing through the cooling portion 30 returns to the refrigerant line 24 via the refrigerant line 36.

Point D shown in FIG. 1 indicates a coupling point among the refrigerant line 23, the refrigerant line 24 and the refrigerant line 36. That is, point D indicates the downstream-side (side closer to the heat exchanger 15) end portion of the refrigerant line 23, the upstream-side (side closer to the heat exchanger 14) end portion of the refrigerant line 24 and the downstream-side end portion of the refrigerant line 36. The refrigerant line 23 forms part of the path routed from the gas-liquid separator 40 to point D within the path of refrigerant flowing from the gas-liquid separator 40 toward the expansion valve 16.

The cooling system 1 further includes a path of refrigerant that serves as a second line arranged in parallel with the refrigerant line 23. The cooling portion 30 is provided in that path of refrigerant. The cooling portion 30 is provided in the second line, which is one of the first line and the second line that are connected in parallel with each other in the path of refrigerant flowing from the heat exchanger 14 toward the heat exchanger 15 between the gas-liquid separator 40 and the expansion valve 16. The cooling portion 30 includes a hybrid vehicle (HV) device 31 and a cooling line 32. The HV device 31 is an electrical device mounted on the vehicle. The cooling line 32 is a line through which refrigerant flows. The HV device 31 is an example of a heat generating source. One end portion of the cooling line 32 is connected to the refrigerant line 34. The other end portion of the cooling line 32 is connected to the refrigerant line 36. The refrigerant line 34, the cooling line 32 and the refrigerant line 36 constitute the second line.

The path of refrigerant, connected in parallel with the refrigerant line 23 between the gas-liquid separator 40 and point D shown in FIG. 1, includes the refrigerant line 34 on the upstream side (side closer to the gas-liquid separator 40) of the cooling portion 30, the cooling line 32 included in the cooling portion 30, and the refrigerant line 36 on the downstream side (side closer to the heat exchanger 15) of the cooling portion 30. The refrigerant line 34 is a line for flowing liquid refrigerant from the gas-liquid separator 40 to the cooling portion 30. The refrigerant line 36 is a line for flowing refrigerant from the cooling portion 30 to point D. Point D is a branching portion between the refrigerant lines 23 and 24 and the refrigerant line 36.

Refrigerant liquid flowing out from the gas-liquid separator 40 flows toward the cooling portion 30 via the refrigerant line 34. Refrigerant that flows to the cooling portion 30 and that flows via the cooling line 32 takes heat from the HV device 31 that serves as the heat generating source to cool the HV device 31. The cooling portion 30 uses liquid refrigerant, separated in the gas-liquid separator 40 and flowing to the cooling line 32 via the refrigerant line 34, to cool the HV device 31. Refrigerant flowing through the cooling line 32 exchanges heat with the HV device 31 in the cooling portion 30 to cool the HV device 31, and the refrigerant is heated. Refrigerant further flows from the cooling portion 30 toward point D via the refrigerant line 36, and reaches the heat exchanger 15 via the refrigerant line 24.

The cooling portion 30 is configured to be able to exchange heat between the HV device 31 and refrigerant in the cooling line 32. In the present embodiment, the cooling portion 30, for example, has the cooling line 32 that is formed such that the outer periphery of the cooling line 32 is in direct contact with the casing of the HV device 31. The cooling line 32 has a portion adjacent to the casing of the HV device 31. At that portion, heat is exchangeable between refrigerant, flowing through the cooling line 32, and the HV device 31.

The HV device 31 is directly connected to the outer periphery of the cooling line 32 that forms part of the path of refrigerant, routed from the heat exchanger 14 to the heat exchanger 15 in the vapor compression refrigeration cycle 10, and is cooled. The HV device 31 is arranged on the outside of the cooling line 32, so the HV device 31 does not interfere with flow of refrigerant flowing inside the cooling line 32. Therefore, the pressure loss of the vapor compression refrigeration cycle 10 does not increase, so the HV device 31 may be cooled without increasing the power of the compressor 12.

Alternatively, the cooling portion 30 may include a selected known heat pipe that is interposed between the HV device 31 and the cooling line 32. In this case, the HV device 31 is connected to the outer periphery of the cooling line 32 via the heat pipe, and heat is transferred from the HV device 31 to the cooling line 32 via the heat pipe to thereby cool the HV device 31. The HV device 31 serves as a heating portion for heating the heat pipe, and the cooling line 32 serves as a cooling portion for cooling the heat pipe to thereby increase the heat-transfer efficiency between the cooling line 32 and the HV device 31, so the cooling efficiency of the HV device 31 may be improved. For example, a Wick heat pipe may be used.

Heat may be reliably transferred from the HV device 31 to the cooling line 32 by the heat pipe, so there may be a distance between the HV device 31 and the cooling line 32, and complex arrangement of the cooling line 32 is not required to bring the cooling line 32 into contact with the HV device 31. As a result, it is possible to improve the flexibility of arrangement of the HV device 31.

The HV device 31 includes an electrical device that exchanges electric power to generate heat. The electrical device includes at least any one of, for example, an inverter used to convert direct-current power to alternating-current power; a motor generator that is a rotating electrical machine, a battery that is an electrical storage device, a converter that is used to step up the voltage of the battery and a DC/DC converter that is used to step down the voltage of the battery. The battery is a secondary battery, such as a lithium ion battery and a nickel metal hydride battery. A capacitor may be used instead of the battery.

The heat exchanger 18 is arranged inside a duct 90 through which air flows. The heat exchanger 18 exchanges heat between refrigerant and air-conditioning air flowing through the duct 90 to adjust the temperature of air-conditioning air. The duct 90 has a duct inlet 91 and a duct outlet 92. The duct inlet 91 is an inlet through which air-conditioning air flows into the duct 90. The duct outlet 92 is an outlet through which air-conditioning air flows out from the duct 90. A fan 93 is arranged near the duct inlet 91 inside the duct 90.

As the fan 93 is driven, air flows through the duct 90. As the fan 93 operates, air-conditioning air flows into the duct 90 via the duct inlet 91. Air flowing into the duct 90 may be outside air or may be air in the cabin of the vehicle. The arrow 95 in FIG. 1 indicates flow of air-conditioning air that flows via the heat exchanger 18 and exchanges heat with refrigerant in the vapor compression refrigeration cycle 10. During cooling operation, air-conditioning air is cooled in the heat exchanger 18, and refrigerant receives heat transferred from air-conditioning air to be heated. The arrow 96 indicates flow of air-conditioning air that is adjusted in temperature by the heat exchanger 18 and that flows out from the duct 90 via the duct outlet 92.

Refrigerant passes through a refrigerant circulation path that is formed by sequentially connecting the compressor 12, the heat exchangers 14 and 15, the expansion valve 16 and the heat exchanger 18 by the refrigerant lines 21 to 27 to circulate in the vapor compression refrigeration cycle 10. Refrigerant flows in the vapor compression refrigeration cycle 10 so as to sequentially pass through points A, B, C, D, E and F shown in FIG. 1, and refrigerant circulates among the compressor 12, the heat exchangers 14 and 15, the expansion valve 16 and the heat exchanger 18.

Figure 2:
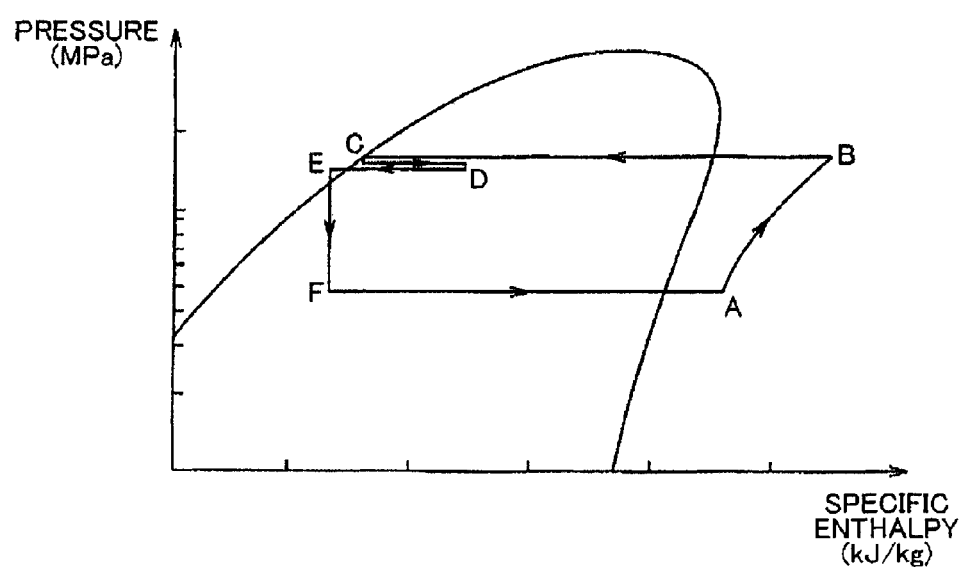
FIG. 2 is a Mollier chart that shows the state of refrigerant in a vapor compression refrigeration cycle.

FIG. 2 is a Mollier chart that shows the state of refrigerant in the vapor compression refrigeration cycle 10. In FIG. 2, the abscissa axis represents the specific enthalpy (unit: kJ/kg) of refrigerant, and the ordinate axis represents the absolute pressure (unit: MPa) of refrigerant. The curve in the chart is the saturation vapor line and saturation liquid line of refrigerant. FIG. 2 shows the thermodynamic state of refrigerant at points (that is, points A, B, C, D, E and F) in the vapor compression refrigeration cycle 10 when refrigerant flows from the refrigerant line 22 at the outlet of the exchanger 14 into the refrigerant line 34 via the gas-liquid separator 40, cools the HV device 31 and returns from the refrigerant line 36 to the refrigerant line 24 at the inlet of the heat exchanger 15 via point D.

As shown in FIG. 2, refrigerant (point A) in a superheated steam state, introduced into the compressor 12, is adiabatically compressed in the compressor 12 along a constant specific entropy line. As refrigerant is compressed, the refrigerant increases in pressure and temperature into high-temperature and high-pressure superheated steam having a high degree of superheat (point B), and then the refrigerant flows to the heat exchanger 14. Gaseous refrigerant discharged from the compressor 12 releases heat to the surroundings to be cooled in the heat exchanger 14 to thereby condense (liquefy). Due to heat exchange with outside air in the heat exchanger 14, the temperature of refrigerant decreases, and refrigerant liquefies. High-pressure refrigerant steam in the heat exchanger 14 becomes dry saturated steam from superheated steam with a constant pressure in the heat exchanger 14, and releases latent heat of condensation to gradually liquefy into wet steam in a gas-liquid mixing state. Condensed refrigerant within refrigerant in a gas-liquid two-phase state is in the state of saturated liquid (point C).

Refrigerant is separated in the gas-liquid separator 40 into gaseous refrigerant and liquid refrigerant. Refrigerant liquid in a liquid phase within refrigerant separated into gas and liquid flows from the gas-liquid separator 40 to the cooling line 32 of the cooling portion 30 via the refrigerant line 34 to cool the HV device 31. In the cooling portion 30, heat is released to liquid refrigerant in a saturated liquid state, which is condensed as it passes through the heat exchanger 14, to thereby cool the HV device 31. Refrigerant is heated by exchanging heat with the HV device 31, and the dryness of the refrigerant increases. Refrigerant receives latent heat from the HV device 31 to partially vaporize into wet steam that mixedly contains saturated liquid and saturated steam (point D).

After that, refrigerant flows into the heat exchanger 15. Wet steam of refrigerant exchanges heat with outside air in the heat exchanger 15 to be cooled to thereby condense again, becomes saturated liquid as the entire refrigerant condenses, and further releases sensible heat to become supercooled liquid (point E). After that, refrigerant flows into the expansion valve 16 via the refrigerant line 25. In the expansion valve 16, refrigerant in a supercooled liquid state is throttle-expanded, and the refrigerant decreases in temperature and pressure with the specific enthalpy unchanged to become low-temperature and low-pressure wet steam in a gas-liquid mixing state (point F).

Refrigerant in a wet steam state from the expansion valve 16 flows into the heat exchanger 18 via the refrigerant line 26. Refrigerant in a wet steam state flows into the tubes of the heat exchanger 18. When refrigerant flows through the tubes of the heat exchanger 18, the refrigerant absorbs heat of air in the cabin of the vehicle as latent heat of vaporization via the fins to evaporate with a constant pressure. As the entire refrigerant becomes dry saturated steam, the refrigerant steam further increases in temperature by sensible heat to become superheated steam (point A). After that, refrigerant is introduced into the compressor 12 via the refrigerant line 27. The compressor 12 compresses refrigerant flowing from the heat exchanger 18.

Refrigerant continuously repeats changes among the compressed state, the condensed state, the throttle-expanded state and the evaporated state in accordance with the above-described cycle. Note that, in the above description of the vapor compression refrigeration cycle, a theoretical refrigeration cycle is described; however, in the actual vapor compression refrigeration cycle 10, it is, of course, necessary to consider a loss in the compressor 12, a pressure loss of refrigerant and a heat loss.

During operation of the vapor compression refrigeration cycle 10, refrigerant absorbs heat of vaporization from air in the cabin of the vehicle at the time when the refrigerant evaporates in the heat exchanger 18 that serves as an evaporator to thereby cool the cabin. In addition, high-pressure liquid refrigerant flowing out from the heat exchanger 14 and separated by the gas-liquid separator 40 into gas and liquid flows to the cooling portion 30 and exchanges heat with the HV device 31 to thereby cool the HV device 31. The cooling system 1 cools the HV device 31, which is the heat generating source mounted on the vehicle, with the use of the vapor compression refrigeration cycle 10 for air-conditioning the cabin of the vehicle. Note that the temperature required to cool the HV device 31 is desirably at least lower than the upper limit of a target temperature range of the HV device 31.

The vapor compression refrigeration cycle 10 that is provided in order to cool a cooled portion in the heat exchanger 18 is utilized to cool the HV device 31, so it is not necessary to provide a device, such as an exclusive water circulation pump and a cooling fan, in order to cool the HV device 31. Therefore, components required for the cooling system 1 to cool the HV device 31 may be reduced to make it possible to simplify the system configuration, so it is possible to reduce the manufacturing cost of the cooling system 1. In addition, it is not necessary to operate a power source, such as a pump and a cooling fan, in order to cool the HV device 31, and power consumption for operating the power source is not required. Thus, it is possible to reduce power consumption for cooling the HV device 31.

In the heat exchanger 14, refrigerant just needs to be cooled into a wet steam state. Refrigerant in a gas-liquid mixing state is separated by the gas-liquid separator 40, and only refrigerant liquid in a saturated liquid state is supplied to the cooling portion 30. Refrigerant in a wet steam state, which receives latent heat of vaporization from the HV device 31 to be partially vaporized, is cooled again in the heat exchanger 15. Refrigerant changes in state at a constant temperature until the refrigerant in a wet steam state completely condenses into saturated liquid. The heat exchanger 15 further supercools liquid refrigerant to a degree of supercooling required to cool the cabin of the vehicle. A degree of supercooling of refrigerant does not need to be excessively increased, so the capacity of each of the heat exchangers 14 and 15 may be reduced. Thus, the cooling performance for cooling the cabin may be ensured, and the size of each of the heat exchangers 14 and 15 may be reduced, so it is possible to obtain the cooling system 1 that is reduced in size and that is advantageous in installation on the vehicle.

The refrigerant line 23 that forms part of the path of refrigerant from the outlet of the heat exchanger 14 toward the inlet of the expansion valve 16 is provided between the heat exchanger 14 and the heat exchanger 15. The refrigerant line 23 that does not pass through the cooling portion 30 and the refrigerant lines 34 and 36 and cooling line 32 that form the path of refrigerant passing through the cooling portion 30 to cool the HV device 31 are provided in parallel with each other as the paths through which refrigerant flowing from the gas-liquid separator 40 toward the expansion valve 16. The cooling system for cooling the HV device 31, including the refrigerant lines 34 and 36, is connected in parallel with the refrigerant line 23. Therefore, only part of refrigerant flowing out from the heat exchanger 14 flows to the cooling portion 30. The amount of refrigerant required to cool the HV device 31 is caused to flow to the cooling portion 30, and the HV device 31 is appropriately cooled. Thus, it is possible to prevent excessive cooling of the HV device 31.

The path of refrigerant that directly flows from the heat exchanger 14 to the heat exchanger 15 and the path of refrigerant that flows from the heat exchanger 14 to the heat exchanger 15 via the cooling portion 30 are provided in parallel with each other, and only part of refrigerant is caused to flow to the refrigerant lines 34 and 36. By so doing, it is possible to reduce the pressure loss at the time when refrigerant flows through the cooling system for cooling the HV device 31. Not the entire refrigerant flows to the cooling portion 30. Therefore, it is possible to reduce the pressure loss associated with flow of refrigerant via the cooling portion 30, and, accordingly, it is possible to reduce power consumption required to operate the compressor 12 for circulating refrigerant.

When low-temperature and low-pressure refrigerant after passing through the expansion valve 16 is used to cool the HV device 31, the cooling performance of air in the cabin in the heat exchanger 18 reduces and the cooling performance for cooling the cabin decreases. In contrast to this, in the cooling system 1 according to the present embodiment, in the vapor compression refrigeration cycle 10, high-pressure refrigerant discharged from the compressor 12 is condensed by both the heat exchanger 14 that serves as a first condenser and the heat exchanger 15 that serves as a second condenser. The two-stage heat exchangers 14 and 15 are arranged between the compressor 12 and the expansion valve 16, and the cooling portion 30 for cooling the HV device 31 is provided between the heat exchanger 14 and the heat exchanger 15. The heat exchanger 15 is provided on the path of refrigerant flowing from the cooling portion 30 toward the expansion valve 16.

By sufficiently cooling refrigerant, which receives latent heat of vaporization from the HV device 31 to be heated, in the heat exchanger 15, the refrigerant has a temperature and a pressure that are originally required to cool the cabin of the vehicle at the outlet of the expansion valve 16. Therefore, it is possible to sufficiently increase the amount of heat externally received when refrigerant evaporates in the heat exchanger 18. In this way, by setting the heat radiation performance for the heat exchanger 15 so that the heat exchanger 15 is able to sufficiently cool refrigerant, it is possible to cool the HV device 31 without any influence on the cooling performance for cooling the cabin. Thus, both the cooling performance for cooling the HV device 31 and the cooling performance for cooling the cabin may be reliably ensured.

When refrigerant flowing from the heat exchanger 14 to the cooling portion 30 cools the HV device 31, the refrigerant receives heat from the HV device 31 to be heated. As refrigerant is heated to a saturated steam temperature or above and the entire amount of the refrigerant vaporizes in the cooling portion 30, the amount of heat exchanged between the refrigerant and the HV device 31 reduces, and the HV device 31 cannot be efficiently cooled, and, in addition, pressure loss at the time when the refrigerant flows in the line increases. Therefore, it is desirable to sufficiently cool refrigerant in the heat exchanger 14 such that the entire amount of refrigerant does not vaporize after cooling the HV device 31.

Specifically, the state of refrigerant at the outlet of the heat exchanger 14 is brought close to saturated liquid, and, typically, refrigerant is placed in a state on the saturated liquid line at the outlet of the heat exchanger 14. Because the heat exchanger 14 is capable of sufficiently cooling refrigerant in this way, the heat radiation performance of the heat exchanger 14 for causing refrigerant to release heat is higher than the heat radiation performance of the heat exchanger 15. By sufficiently cooling refrigerant in the heat exchanger 14 having relatively high heat radiation performance, refrigerant that has received heat from the HV device 31 is maintained in a wet steam state, and a reduction in the amount of heat exchanged between refrigerant and the HV device 31 is avoided, so it is possible to sufficiently cool the HV device 31. Refrigerant in a wet steam state after cooling the HV device 31 is efficiently cooled again in the heat exchanger 15, and is cooled into a supercooled liquid state below a saturated temperature. Thus, it is possible to provide the cooling system 1 that ensures both the cooling performance for cooling the cabin and the cooling performance for cooling the HV device 31.

Refrigerant in a gas-liquid two-phase state at the outlet of the heat exchanger 14 is separated into gas and liquid in the gas-liquid separator 40. Gaseous refrigerant separated in the gas-liquid separator 40 flows via the refrigerant lines 23 and 24 and is directly supplied to the heat exchanger 15. Liquid refrigerant separated in the gas-liquid separator 40 flows via the refrigerant line 34 and is supplied to the cooling portion 30 to cool the HV device 31. The liquid refrigerant is refrigerant in a just saturated liquid state. By taking only liquid refrigerant from the gas-liquid separator 40 and flowing the liquid refrigerant to the cooling portion 30, it is possible to fully utilize the performance of the heat exchanger 14 to cool the HV device 31, so it is possible to provide the cooling system 1 having improved cooling performance for cooling the HV device 31.

Refrigerant in a saturated liquid state at the outlet of the gas-liquid separator 40 is introduced into the cooling line 32 that cools the HV device 31 to thereby make it possible to minimize gaseous refrigerant within refrigerant that flows in the cooling system for cooling the HV device 31, including the refrigerant lines 34 and 36 and the cooling line 32. Therefore, it is possible to suppress an increase in pressure loss due to an increase in the flow rate of refrigerant steam flowing in the cooling system for cooling the HV device 31, and it is possible to reduce the power consumption of the compressor 12 for flowing refrigerant, so it is possible to avoid deterioration of the performance of the vapor compression refrigeration cycle 10.

Refrigerant liquid in a saturated liquid state is stored inside the gas-liquid separator 40. The gas-liquid separator 40 has the function of a reservoir that temporarily stores refrigerant liquid, which is liquid refrigerant, inside. When refrigerant liquid in a predetermined amount is stored in the gas-liquid separator 40, the flow rate of refrigerant flowing from the gas-liquid separator 40 to the cooling portion 30 may be maintained at the time of fluctuations in load. Because the gas-liquid separator 40 has the function of storing liquid, serves as a buffer against load fluctuations and is able to absorb load fluctuations, it is possible to stabilize the cooling performance for cooling the HV device 31.

Referring back to FIG. 1, the cooling system 1 includes a communication line 51. The communication line 51 provides fluid communication between the refrigerant line 21, through which refrigerant flows between the compressor 12 and the heat exchanger 14, and the refrigerant line 36 on the downstream side of the cooling portion 30 between the refrigerant lines 34 and 36 that flow refrigerant through the cooling portion 30.

A selector valve 52 is provided in the refrigerant lines 23 and 36 and the communication line 51. The selector valve 52 is provided in the middle of the refrigerant line 23, and is provided at a branching portion between the refrigerant line 36 and the communication line 51. The refrigerant line 23 is divided into a refrigerant line 23a on the upstream side of the selector valve 52 and a refrigerant line 23b on the downstream side of the selector valve 52. The refrigerant line 36 is divided into a refrigerant line 36a on the upstream side of the selector valve 52 and a refrigerant line 36b on the downstream side of the selector valve 52.

More specifically, the selector valve 52 includes valves 57 and 58. The valve 57 is provided in the refrigerant line 23. The valve 57 switches a fluid communication state between the refrigerant line 23a and the refrigerant line 23b. The valve 57 switches between the open state and the closed state to thereby allow or interrupt flow of refrigerant from the refrigerant line 23a to the refrigerant line 23b. The valve 58 is provided at a branching point between the refrigerant line 36 and the communication line 51. The valve 58 switches a fluid communication state between the refrigerant line 36 and the communication line 51. The valve 58 switches between the open state and the closed state to thereby allow or interrupt flow of refrigerant via the communication line 51.

By switching the path of refrigerant with the use of the selector valve 52, it is possible to cause refrigerant after cooling the HV device 31 to flow to any selected one of the paths, that is, to the heat exchanger 15 via the refrigerant lines 36b and 24 or to the heat exchanger 14 via the communication line 51 and the refrigerant line 21.

During cooling operation of the vapor compression refrigeration cycle 10, the open/close states of the valves 57 and 58 are adjusted so that refrigerant flows from the gas-liquid separator 40 to the heat exchanger 15 via the valve 57 and refrigerant flows from the cooling portion 30 to the heat exchanger 15 via the valve 58. By so doing, it is possible to reliably cause refrigerant flowing through the refrigerant line 36a after cooling the HV device 31 to flow to the heat exchanger 15 via the refrigerant line 36b.

On the other hand, during a stop of the vapor compression refrigeration cycle 10, the open/close states of the valves 57 and 58 are adjusted so that flow of refrigerant via the valve 57 is interrupted and refrigerant flowing out from the cooling portion 30 flows from the refrigerant line 36a to the communication line 51 via the valve 58. By so doing, it is possible to cause refrigerant flowing through the refrigerant line 36a after cooling the HV device 31 to flow to the heat exchanger 14 via the communication line 51 to make it possible to form an annular path that causes refrigerant to circulate between the cooling portion 30 and the heat exchanger 14 without passing through the compressor 12.

Figure 3:
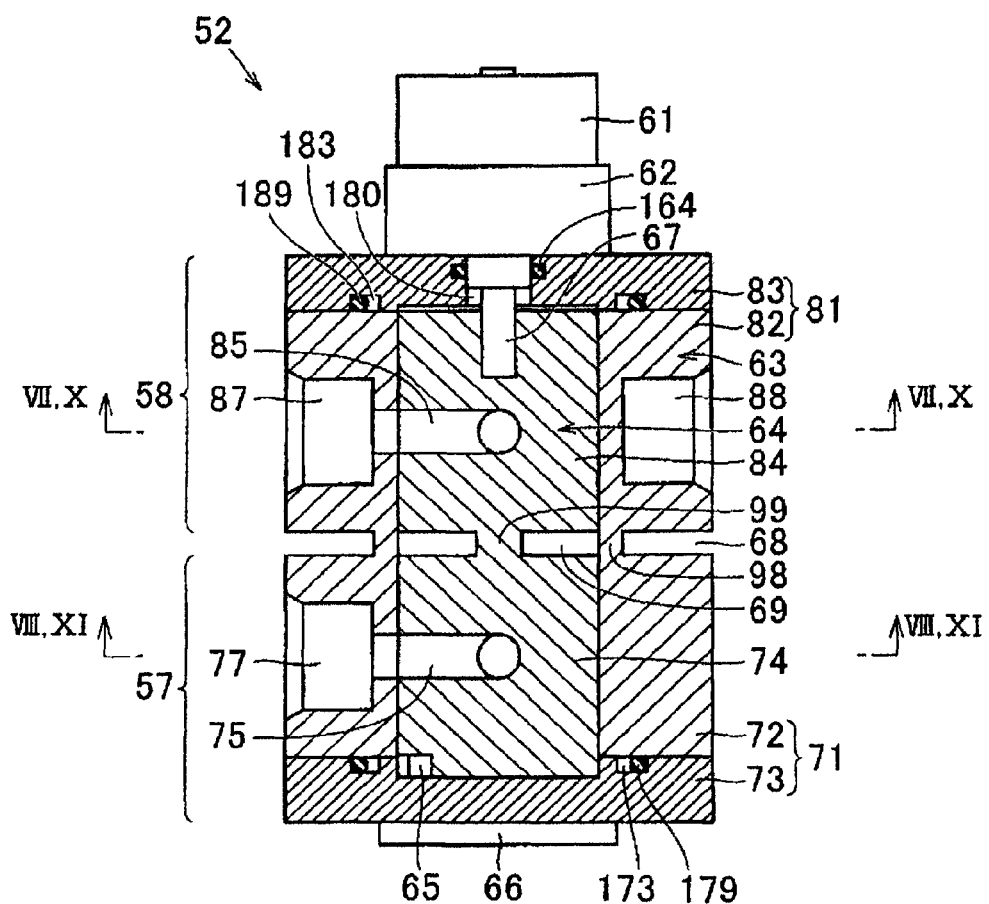
FIG. 3 is a cross-sectional view that shows the details of a selector valve shown in FIG. 1.
Figure 4:
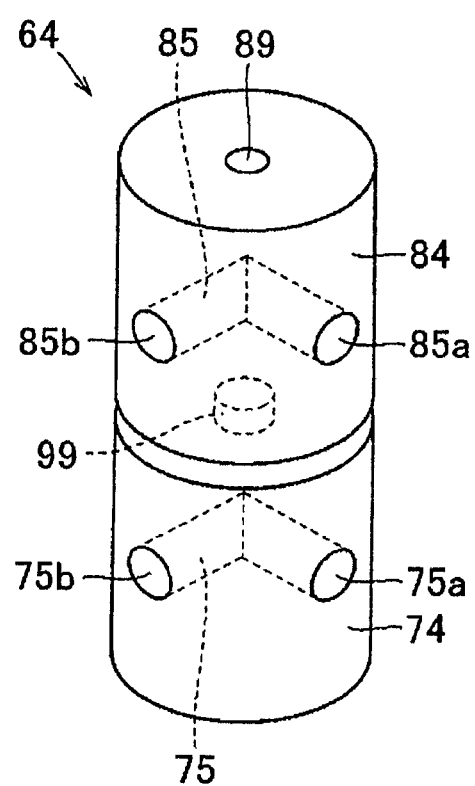
FIG. 4 is a perspective view that shows the configuration of a valve element member.

FIG. 3 is a cross-sectional view that shows the details of the selector valve 52 shown in FIG. 1. FIG. 4 is a perspective view that shows the configuration of a valve element member 64 included in the selector valve 52 shown in FIG. 3. An example of the structure of the selector valve 52 will be described with reference to FIG. 3 and FIG. 4.

As shown in FIG. 3, the selector valve 52 is provided as an integrated valve that has a single valve structure that integrates the valve 57 serving as a first selector valve and the valve 58 serving as a second selector valve into a unit structure. The selector valve 52 includes a driving motor 61 and a speed reducer 62. The speed reducer 62 is used to reduce the speed of the output of the motor 61. The selector valve 52 includes the valve element member 64 and a housing member 63. The valve element member 64 is rotated by rotational driving force generated by the motor 61. The housing member 63 is arranged around the valve element member 64. The selector valve 52 includes a sensing magnet 65 and a sensor unit 66. The sensing magnet 65 and the sensor unit 66 are used to detect the rotational position of the valve element member 64.

A substantially circular columnar hollow space is formed inside the housing member 63. The valve element member 64 has a substantially circular columnar outer shape. The valve element member 64 has an outside diameter that is slightly smaller than the bore diameter of the hollow space formed in the housing member 63. The housing member 63 and the valve element member 64 are formed such that the axial lengths are substantially equal to each other and the valve element member 64 is accommodated in the hollow space inside the housing member 63. The valve element member 64 is accommodated inside the housing member 63 so as to be relatively movable with respect to the housing member 63.

The selector valve 52 further includes a lid member 83 and a lid member 73. The lid member 83 is arranged adjacent to one axial end portion with respect to the housing member 63 and the valve element member 64. The lid member 73 is arranged adjacent to the other axial end portion with respect to the housing member 63 and the valve element member 64. The lid member 83 is arranged at an end portion, at which the motor 61 is arranged, with respect to the housing member 63 and the valve element member 64. The lid member 73 is arranged at an end portion, at which the sensor unit 66 is arranged, with respect to the housing member 63 and the valve element member 64.

The motor 61 is an electric motor that receives electric energy, converts the electric energy to mechanical energy and outputs the mechanical energy. The motor 61 is directly assembled to the speed reducer 62. The speed reducer 62 is fixed to the outer face of the lid member 83 by a selected fixing member, such as a screw. The lid members 73 and 83 are fixed to the end face of the housing member 63 by a selected fixing member, such as a screw. The lid member 83 has a plate-shaped outer shape, and has a through-hole 180 at its center portion. The through-hole 180 extends through the lid member 83 in the thickness direction.

A hole portion 89 is formed at one end of the valve element member 64 (see FIG. 4). A shaft 67 is inserted in the hole portion 89. One end of the shaft 67 is fixed to the speed reducer 62, and the other end of the shaft 67 is inserted in the hole portion 89 formed in the valve element member 64. The shaft 67 is arranged so as to extend through the through-hole 180 formed in the lid member 83, and couples the speed reducer 62 to the valve element member 64.

Driving force generated by the motor 61 and transmitted via the speed reducer 62 is transmitted to the valve element member 64 by the shaft 67. The motor 61 that serves as a drive unit transmits driving force to the valve element member 64 via the speed reducer 62 and the shaft 67, and rotates the valve element member 64 in both directions. The motor 61 is connected to the valve element member 64 via the speed reducer 62. By so doing, rotational driving force that acts on the valve element member 64 is reduced.

The valve element member 64 includes a valve element 74 that serves as a first valve element and a valve element 84 that serves as a second valve element. Each of the valve element 74 and the valve element 84 has a circular columnar outer shape. The valve elements 74 and 84 according to the present embodiment have substantially the same diameter and substantially the same axial length, and are formed in substantially the same outer shape. The valve elements 74 and 84 may have different diameters and/or different axial lengths as long as the valve elements 74 and 84 are rotatably accommodated inside the housing member 63.

The valve element member 64 includes a coupling shaft portion 99 that couples an end portion of the valve element 74 to an end portion of the valve element 84. The valve element 74 and the valve element 84 are axially coupled to each other via the coupling shaft portion 99, and are formed as a unit structure. The coupling shaft portion 99 is formed in a circular columnar shape having a smaller diameter than the valve elements 74 and 84. Because the diameter of the coupling shaft portion 99 is smaller than the diameters of the valve elements 74 and 84, a hollow space 69 is formed around the coupling shaft portion 99 between the valve element 74 and the valve element 84. The space 69 is formed at the axially center portion of the valve element member 64. The space 69 serves as a gap by which the valve elements 74 and 84 are spaced apart from each other.

The diameter of the coupling shaft portion 99 is set to a small value as much as possible within a range in which, at the time when the valve element member 64 is actuated, the valve element member 64 has a sufficient strength so that the valve element member 64 does not break from the coupling shaft portion 99 as a starting point. For example, the coupling shaft portion 99 may have a diameter smaller than or equal to a quarter of the diameter of the smaller one of the valve elements 74 and 84.

The valve element 74 has a through-hole 75 that serves as a first through-hole. The through-hole 75 is formed to extend through the inside of the valve element 74 between two points having different circumferential positions of the valve element on the outer periphery of the circular columnar valve element 74. As shown in FIG. 4, the through-hole 75 is open at openings 75a and 75b on the outer periphery of the valve element 74. In the present embodiment, the through-hole 75 has an L shape, and is formed by a pair of perpendicular linear holes inside the valve element 74. The openings 75a and 75b are formed at positions that are shifted by 90° from each other in the circumferential direction of the valve element 74.

The valve element 84 has a through-hole 85 that serves as a second through-hole. The through-hole 85 is formed to extend through the inside of the valve element 84 between two points having different circumferential positions of the valve element on the outer periphery of the circular columnar valve element 84. As shown in FIG. 4, the through-hole 85 is open at openings 85a and 85b on the outer periphery of the valve element 84. In the present embodiment, the through-hole 85 has an L shape, and is formed by a pair of perpendicular linear holes inside the valve element 84. The openings 85a and 85b are formed at positions that are shifted by 90° from each other in the circumferential direction of the valve element 84.

The opening 75a formed in the valve element 74 and the opening 85a formed in the valve element 84 are formed at the same position in the circumferential direction of the valve element member 64. The opening 75b formed in the valve element 74 and the opening 85b formed in the valve element 84 are formed at the same position in the circumferential direction of the valve element member 64.

The housing member 63 has a hollow cylindrical sleeve portion 72. The hollow space formed inside the sleeve portion 72 has a cylindrical inner periphery. The sleeve portion 72 and the above-described lid member 73 constitute a first housing 71. The first housing 71 has the lid member 73 and the sleeve portion 72. The lid member 73 covers one end face of the valve element 74. The sleeve portion 72 covers the outer periphery of the valve element 74. The first housing 71 has a case shape, and accommodates the valve element 74 inside.

The housing member 63 has a hollow cylindrical sleeve portion 82. The hollow space formed inside the sleeve portion 82 has a cylindrical inner periphery. The sleeve portion 82 and the above-described lid member 83 constitute a second housing 81. The second housing 81 has the lid member 83 and the sleeve portion 82. The lid member 83 covers one end face of the valve element 84. The sleeve portion 82 covers the outer periphery of the valve element 84. The second housing 81 has a case shape, and accommodates the valve element 84 inside.

The sleeve portions 72 and 82 according to the present embodiment have substantially the same inside diameter and outside diameter and substantially the same axial length, and are formed in substantially the same outer shape. The sleeve portions 72 and 82 may have different diameters and/or different axial lengths as long as the sleeve portions 72 and 82 respectively cover the outer peripheries of the valve elements 74 and 84 and are respectively able to accommodate the valve elements 74 and 84 inside.

The housing member 63 includes a coupling annular portion 98 that couples an end portion of the sleeve portion 72 to an end portion of the sleeve portion 82. The sleeve portion 72 and the sleeve portion 82 are axially coupled to each other via the coupling annular portion 98, and are formed as a unit structure. The coupling annular portion 98 is formed in an annular shape that has an inside diameter equal to the inside diameters of the sleeve portions 72 and 82 and an outside diameter smaller than the outside diameters of the sleeve portions 72 and 82. Because the outside diameter of the coupling annular portion 98 is smaller than the outside diameters of the sleeve portions 72 and 82, a hollow space 68 is formed around the coupling annular portion 98 between the sleeve portion 72 and the sleeve portion 82. The space 68 is formed at the axially center portion of the housing member 63. The space 68 serves as a gap by which the sleeve portions 72 and 82 are spaced apart from each other.

The diameter of the coupling annular portion 98 is set to a small value as much as possible within a range in which the housing member 63 has a sufficient strength so that the housing member 63 does not break from the coupling annular portion 98 as a starting point. For example, the coupling annular portion 98 may have a radial size that is smaller than or equal to one-fifth of the radial size of the smaller one of the sleeve portions 72 and 82.

The sleeve portion 72 has radial holes 76 and 77 that extend through the sleeve portion 72 in the radial direction of the sleeve portion 72. In the present embodiment, the radial holes 76 and 77 are formed at positions that are shifted by 90° from each other in the circumferential direction of the sleeve portion 72.

The sleeve portion 82 has radial holes 86, 87 and 88 that extend through the sleeve portion 82 in the radial direction of the sleeve portion 82. In the present embodiment, the radial holes 86 and 87 are formed at positions that are shifted by 90° from each other in the circumferential direction of the sleeve portion 82, and the radial holes 86 and 88 are formed at positions that are shifted by 90° from each other in the circumferential direction of the sleeve portion 82.

The valve 57 includes the first housing 71 and the valve element 74. The first housing 71 has the sleeve portion 72. The sleeve portion 72 has the radial holes 76 and 77. Refrigerant flowing through the valve 57 flows into the through-hole 75 via the radial hole 76, flows out from the through-hole 75 and flows to the radial hole 77. The radial holes 76 and 77 form a first flow passage through which refrigerant flowing through the through-hole 75 passes. The radial hole 76 is provided as a first inlet passage through which refrigerant flowing into the through-hole 75 passes. The radial hole 77 is provided as a first outlet passage through which refrigerant flowing out from the through-hole 75 passes. Fluid communication and interruption between the through-hole 75 and at least any one of the radial holes 76 and 77 are switched by actuating the valve element 74.

The valve 58 includes the second housing 81 and the valve element 84. The second housing 81 has the sleeve portion 82. The sleeve portion 82 has the radial holes 86, 87 and 88. Refrigerant flowing through the valve 58 flows into the through-hole 85 via the radial hole 86, flows out from the through-hole 85 and flows into any one of the radial holes 87 and 88. The radial holes 86, 87 and 88 form a second flow passage through which refrigerant flowing through the through-hole 85 passes.

The radial hole 86 is provided as a second inlet passage through which refrigerant flowing into the through-hole 85 passes. The radial hole 87 is provided as one of second outlet passages through which refrigerant flowing out from the through-hole 85 passes. The radial hole 88 is provided as the other one of the second outlet passages through which refrigerant flowing out from the through-hole 85 passes. The second flow passage has one second inlet passage and two second outlet passages. Fluid communication and interruption between the through-hole 85 and at least one of the radial holes 86, 87 and 88 are switched by actuating the valve element 84.

An annular groove 173 is formed on a face of the lid member 73, facing the sleeve portion 72. A seal member 179, such as an O-ring, is, for example, provided inside the annular groove 173. The seal member 179 seals a gap between the lid member 73 and the sleeve portion 72. An annular groove 183 is formed on a face of the lid member 83, facing the sleeve portion 82. A seal member 189 is provided inside the annular groove 183. The seal member 189 seals a gap between the lid member 83 and the sleeve portion 82. An annular groove is formed on the inner periphery of the through-hole 180 that extends through the lid member 83. A seal member 164 is provided inside the annular groove. The seal member 164 seals a gap between the lid member 83 and the shaft 67.

The sensing magnet 65 is fixed by a method, such as adhesion, at an offset position on an end face of the valve element 74, facing the lid member 83. The sensor unit 66 is fixed to the outer side of the lid member 83, and includes a lead switch, or the like, for detecting the position of the sensing magnet 65. When the valve element member 64 rotates, the position of the sensing magnet 65 on the end face of the valve element member 64 is detected by the sensor unit 66 with the use of the property that the lead switch senses a magnetic field to open or close. By so doing, the sensor unit 66 detects the rotational position of the valve element member 64 in the circumferential direction.

Instead of the sensing magnet 65 and the sensor unit 66 that uses the lead switch, the rotational position of the valve element member 64 may be detected by using another magnetic or optical encoder, or the like. In addition, a stepping motor, or the like, may be used instead of the ordinary motor 61.

Figures 5, 6:
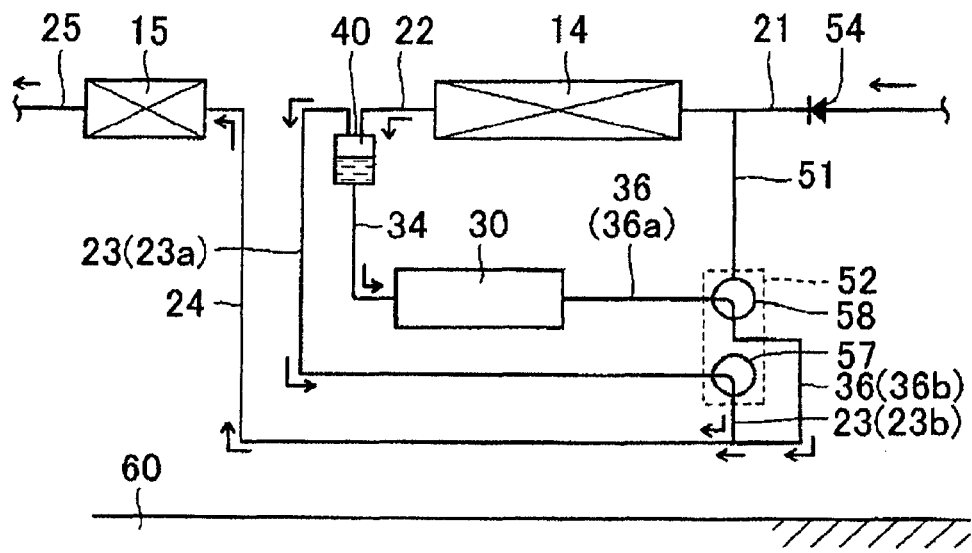
FIG. 5 is a schematic view that shows the flow of refrigerant that cools an HV device during operation of the vapor compression refrigeration cycle.
FIG. 6 is a view that shows flow of refrigerant via the selector valve in each operation mode of the cooling system.

FIG. 5 is a schematic view that shows flow of refrigerant that cools the HV device 31 during operation of the vapor compression refrigeration cycle 10. FIG. 5 shows flow of refrigerant when the vapor compression refrigeration cycle 10 is operated, that is, when the compressor 12 is operated to flow refrigerant through the whole of the vapor compression refrigeration cycle 10. FIG. 6 is a view that shows flow of refrigerant via the selector valve in each operation mode of the cooling system.

As shown in FIG. 5, during "air-conditioner operation mode" in which the compressor 12 is driven and the vapor compression refrigeration cycle 10 is operated, the selector valve 52 is operated so as to flow refrigerant from the cooling portion 30 to the expansion valve 16 via the heat exchanger 15. That is, as shown in the upper row of FIG. 6, refrigerant is caused to flow from the gas-liquid separator 40 toward the heat exchanger 15 via the valve 57, and refrigerant is caused to flow from the cooling portion 30 toward the heat exchanger 15 via the valve 58. By so doing, the path of refrigerant is selected so that refrigerant flows through the whole of the cooling system 1. Therefore, it is possible to ensure the cooling performance of the vapor compression refrigeration cycle 10, and it is possible to efficiently cool the HV device 31.

FIG. 7 is a cross-sectional view of the selector valve 52, taken along the line VII-VII in FIG. 3. FIG. 7 shows the cross section of the selector valve 52, showing an open/close state of the valve 58 during operation in the "air-conditioner operation mode". FIG. 8 is a cross-sectional view of the selector valve 52, taken along the line VIII-VIII in FIG. 3. FIG. 8 shows the cross section of the selector valve 52, showing an open/close state of the valve 57 during operation in the "air-conditioner operation mode".

When the valve element 84 is arranged in the position shown in FIG. 7, the through-hole 85 formed in the valve element 84 communicates with the radial holes 86 and 87 formed in the sleeve portion 82 to form a flow passage of refrigerant indicated by the arrow in the drawing. At this time, the radial hole 86 is connected to the refrigerant line 36a, and the radial hole 87 is connected to the refrigerant line 36b. By so doing, a path of refrigerant is formed so that refrigerant flowing out from the cooling portion 30 and flowing through the refrigerant line 36a flows into the through-hole 85 via the radial hole 86, passes through the through-hole 85, flows to the refrigerant line 36b via the radial hole 87 and reaches the heat exchanger 15.

When the valve element 74 is arranged in the position shown in FIG. 8, the through-hole 75 formed in the valve element 74 communicates with the radial holes 76 and 77 formed in the sleeve portion 72 to form a flow passage of refrigerant indicated by the arrow in the drawing. At this time, the radial hole 76 is connected to the refrigerant line 23a, and the radial hole 77 is connected to the refrigerant line 23b. By so doing, a passage of refrigerant is formed so that refrigerant flowing out from the gas-liquid separator 40 and flowing through the refrigerant line 23a flows into the through-hole 75 via the radial hole 76, passes through the through-hole 75, flows to the refrigerant line 23b via the radial hole 77 and reaches the heat exchanger 15.

In the selector valve 52 shown in FIG. 3, the motor 61 is rotated by supplying current to the motor 61, the output rotation is transmitted to the speed reducer 62, and the shaft 67 and the valve element member 64 coupled to the shaft 67 are rotated by the output rotation reduced in speed. By so doing, the valve element 74 and the valve element 84 integrally rotate. By detecting the rotational position of the valve element member 64 with the use of the sensor unit 66, the valve element member 64 is stopped in a desired position to form the open/close states of the valves 57 and 58 respectively shown in FIG. 8 and FIG. 7 to thereby make it possible to form a path of refrigerant.

Figure 9:
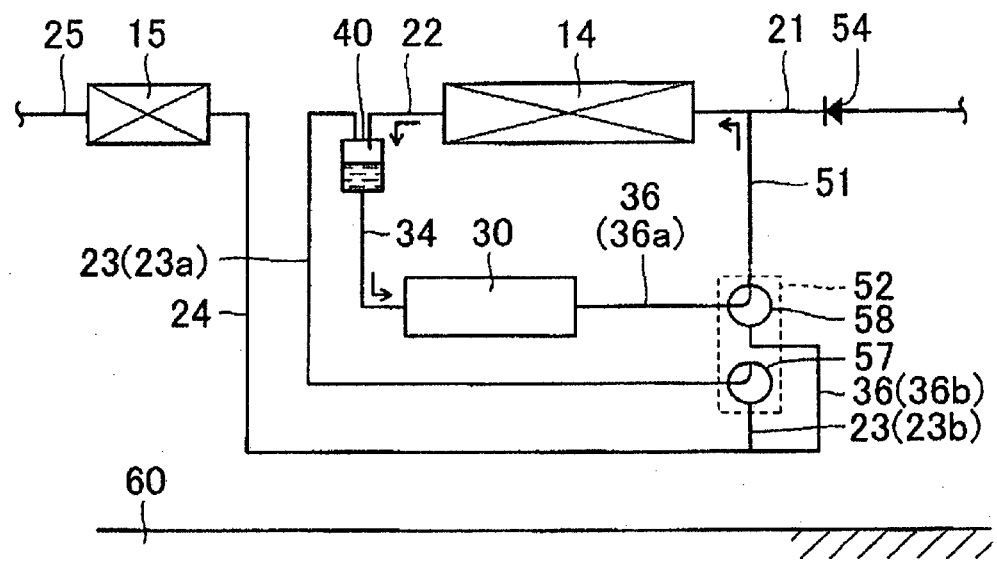
FIG. 9 is a schematic view that shows the flow of refrigerant that cools the HV device during a stop of the vapor compression refrigeration cycle.

FIG. 9 is a schematic view that shows flow of refrigerant that cools the HV device 31 during a stop of the vapor compression refrigeration cycle 10. FIG. 9 shows flow of refrigerant when the vapor compression refrigeration cycle 10 is stopped, that is, when the compressor 12 is stopped to circulate refrigerant via the annular path that connects the cooling portion 30 to the heat exchanger 14.

During "heat pipe operation mode" in which the compressor 12 is stopped and the vapor compression refrigeration cycle 10 is stopped, shown in FIG. 9, the selector valve 52 is operated so as to circulate refrigerant from the cooling portion 30 to the heat exchanger 14. That is, as shown in the lower row of FIG. 6, as the valve 57 is fully closed to flow refrigerant from the cooling portion 30 toward the heat exchanger 14 via the valve 58, refrigerant does not flow from the refrigerant line 36a to the refrigerant line 36b but flows via the communication line 51. By so doing, a closed annular path is formed. The closed annular path is routed from the heat exchanger 14 to the cooling portion 30 via the refrigerant line 22 and the refrigerant line 34 sequentially, further passes through the refrigerant line 36a, the communication line 51 and the refrigerant line 21 sequentially and returns to the heat exchanger 14.

Refrigerant may be circulated between the heat exchanger 14 and the cooling portion 30 via the annular path without operating the compressor 12. When refrigerant cools the HV device 31, the refrigerant receives latent heat of vaporization from the HV device 31 to evaporate. Refrigerant steam vaporized by exchanging heat with the HV device 31 flows to the heat exchanger 14 via the refrigerant line 36a, the communication line 51 and the refrigerant line 21 sequentially. In the heat exchanger 14, refrigerant steam is cooled to condense by travelling wind of the vehicle or draft from the engine cooling radiator fan. Refrigerant liquid liquefied in the heat exchanger 14 returns to the cooling portion 30 via the refrigerant lines 22 and 34.

In this way, a heat pipe in which the HV device 31 serves as a heating portion and the heat exchanger 14 serves as a cooling portion is formed by the annular path that passes through the cooling portion 30 and the heat exchanger 14. Thus, when the vapor compression refrigeration cycle 10 is stopped, that is, when a cooler for the vehicle is stopped as well, the HV device 31 may be reliably cooled without the necessity of start of the compressor 12. Because the compressor 12 is not required to constantly operate in order to cool the HV device 31, the power consumption of the compressor 12 is reduced to thereby make it possible to improve the fuel economy of the vehicle and, in addition, to extend the life of the compressor 12, so it is possible to improve the reliability of the compressor 12.

FIG. 5 and FIG. 9 show a ground 60. The cooling portion 30 is arranged below the heat exchanger 14 in the vertical direction perpendicular to the ground 60. In the annular path that circulates refrigerant between the heat exchanger 14 and the cooling portion 30, the cooling portion 30 is arranged below, and the heat exchanger 14 is arranged above. The heat exchanger 14 is arranged at the level higher than the cooling portion 30.

In this case, refrigerant steam heated and vaporized in the cooling portion 30 goes up in the annular path, reaches the heat exchanger 14, is cooled in the heat exchanger 14, condenses into liquid refrigerant, goes down in the annular path by the action of gravity and returns to the cooling portion 30. That is, a thermo-siphon heat pipe is formed of the cooling portion 30, the heat exchanger 14 and the refrigerant paths that connect them. Because the heat transfer efficiency from the HV device 31 to the heat exchanger 14 may be improved by forming the heat pipe, when the vapor compression refrigeration cycle 10 is stopped as well, the HV device 31 may be further efficiently cooled without additional power.

The cooling system 1 further includes a check valve 54. The check valve 54 is arranged in the refrigerant line 21 between the compressor 12 and the heat exchanger 14 on the side closer to the compressor 12 than the connection portion between the refrigerant line 21 and the communication line 51. The check valve 54 allows flow of refrigerant from the compressor 12 toward the heat exchanger 14 and prohibits flow of refrigerant in the opposite direction. By so doing, during the heat pipe operation mode shown in FIG. 9, it is possible to reliably form a closed loop path of refrigerant for circulating refrigerant between the heat exchanger 14 and the cooling portion 30.

When no check valve 54 is provided, refrigerant may flow from the communication line 51 to the refrigerant line 21 adjacent to the compressor 12. By providing the check valve 54, it is possible to reliably prohibit flow of refrigerant from the communication line 51 toward the side adjacent to the compressor 12, so it is possible to prevent a decrease in the cooling performance for cooling the HV device 31 with the use of the heat pipe that forms the annular refrigerant path during a stop of the vapor compression refrigeration cycle 10. Thus, when the cooler for the cabin of the vehicle is stopped as well, it is possible to efficiently cool the HV device 31.

In addition, when the amount of refrigerant in the closed loop path of refrigerant is insufficient during a stop of the vapor compression refrigeration cycle 10, the compressor 12 is operated only in a short period of time to thereby make it possible to supply refrigerant to the closed loop path via the check valve 54. By so doing, the amount of refrigerant in the closed loop is increased to thereby make it possible to increase the amount of heat exchanged by the heat pipe. Thus, the amount of refrigerant in the heat pipe may be ensured, so it is possible to avoid insufficient cooling of the HV device 31 because of an insufficient amount of refrigerant.

Figure 10:
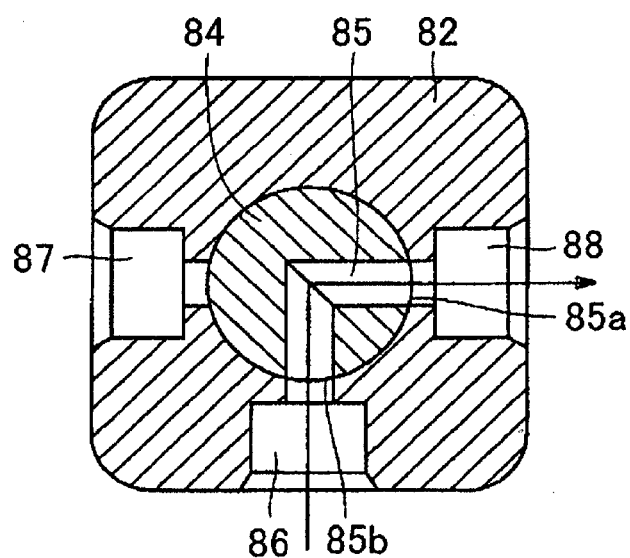
FIG. 10 is a cross-sectional view of the selector valve, taken along the line X-X in FIG. 3.
Figure 11:
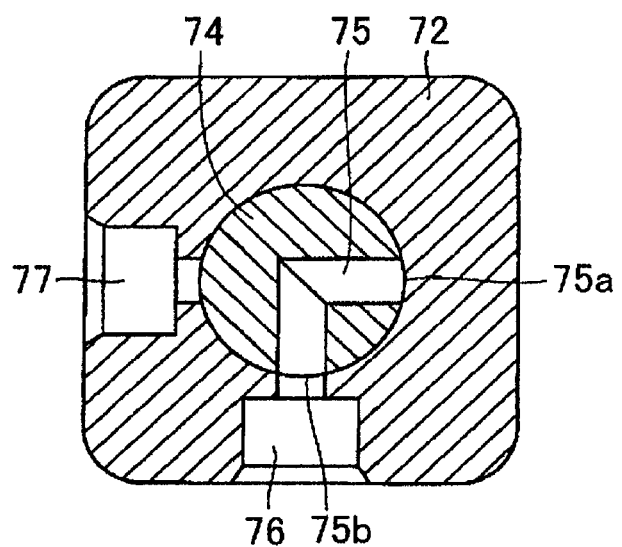
FIG. 11 is a cross-sectional view of the selector valve, taken along the line XI-XI in FIG. 3.

FIG. 10 is a cross-sectional view of the selector valve 52, taken along the line X-X in FIG. 3. FIG. 10 shows the cross section of the selector valve 52, showing an open/close state of the valve 58 during operation in the "heat pipe operation mode". FIG. 11 is a cross-sectional view of the selector valve 52, taken along the line XI-XI in FIG. 3. FIG. 11 shows the cross section of the selector valve 52, showing an open/close State of the valve 57 during operation in the "heat pipe operation mode".

When the valve element 84 is rotated from the state shown in FIG. 7 by 90° in the counterclockwise direction, the valve element 84 is arranged in the position shown in FIG. 10. The through-hole 85 formed in the valve element 84 communicates with the radial holes 86 and 88 formed in the sleeve portion 82 to form a flow passage of refrigerant indicated by the arrow in the drawing. At this time, the radial hole 86 is connected to the refrigerant line 36a, and the radial hole 88 is connected to the communication line 51. By so doing, a path of refrigerant is formed so that refrigerant flowing out from the cooling portion 30 and flowing through the refrigerant line 36a flows into the through-hole 85 via the radial hole 86, passes through the through-hole 85, flows to the communication line 51 via the radial hole 88 and reaches the heat exchanger 14.

When the valve element 74 is rotated from the state shown in FIG. 8 by 90° in the counterclockwise direction, the valve element 74 is arranged in the position shown in FIG. 11. The through-hole 75 formed in the valve element 74 communicates with the radial hole 76 formed in the sleeve portion 72 but does not communicate with the radial hole 77, so a flow passage of refrigerant, passing through the valve 57, is not formed. By so doing, the valve 57 is closed, so flow of refrigerant flowing out from the gas-liquid separator 40 and flowing through the refrigerant line 23a is not formed.

The valve element member 64 is rotated by the output rotation of the motor 61 from the positions of the valve elements 74 and 84 respectively shown in FIG. 7 and FIG. 8, and the rotation angle of 90° is detected by the sensor unit 66 to determine the rotational position of the valve element member 64. By so doing, the valve element 74 and the valve element 84 are integrally actuated to make it possible to form the open/close states of the valves 57 and 58 respectively shown in FIG. 11 and FIG. 10.

In this way, by rotating the valve element member 64 of the selector valve 52 by 90°, it is possible to easily switch between the open/close states of the valves 57 and 58 in the "air-conditioner operation mode" shown in FIG. 8 and FIG. 7 and the open/close states of the valves 57 and 58 in the "heat pipe operation mode" shown in FIGS. 11 and 10. It is possible to selectively switch the operation mode with the use of the one selector valve 52 that serves as the integrated valve including the plurality of valves 57 and 58, and it is possible to reduce size, weight and cost of the selector valve 52, so it is possible to provide the cooling system 1 that is advantageous in space and cost. The motor 61 that is the single drive source is used to make ,it possible to switch both the valves 57 and 58, so it is possible to further reduce the cost of the selector valve 52.

In the "air-conditioner operation mode", high-temperature refrigerant compressed in the compressor 12 flows from the refrigerant line 21 via the communication line 51 and reaches the radial hole 88 inside the valve 58. On the other hand, refrigerant in a saturated liquid state, separated by the gas-liquid separator 40 into gas and liquid, flows through the valve 57. If heat is transferred from high-temperature refrigerant inside the radial hole 88 to refrigerant flowing through the valve 57, refrigerant flowing through the valve 57 vaporizes. If refrigerant vaporizes inside the valve 57, it is required to increase the flow rate of liquid refrigerant supplied from the gas-liquid separator 40 to the valve 57, so the amount of liquid refrigerant stored in the gas-liquid separator 40 decreases. Moreover, there is inconvenience that refrigerant supplied to the cooling portion 30 becomes short and cooling performance for cooling the HV device 31 decreases.

Then, in the selector valve 52 according to the present embodiment, the hollow space 69 is formed between the valve elements 74 and 84, and the hollow space 68 is formed between the sleeve portions 72 and 82. The space 69 is formed so as not to be in fluid communication with both the through-hole 75 formed in the valve element 74 and the through-hole 85 formed in the valve element 84. The space 68 is formed so as not to be in fluid communication with both the radial holes 76 and 77 formed in the sleeve portion 72 and the radial holes 86, 87 and 88 formed in the sleeve portion 82.

Air having a low thermal conductivity is present inside the spaces 68 and 69, and the amount of heat transferred via the spaces 68 and 69 reduces. The space 69 functions as a valve element heat insulating unit that suppresses transfer of heat between the valve element 74 and the valve element 84. The space 68 functions as a housing heat insulating unit that suppresses transfer of heat between the first housing 71 that includes the sleeve portion 72 and the second housing 81 that includes the sleeve portion 82.

By so doing, even when the selector valve 52 that is the integrated valve formed of the valves 57 and 58 as a unit structure is used, it is possible to suppress transfer of heat from high-temperature refrigerant inside the valve 58 to low-temperature refrigerant flowing through the valve 57. Therefore, it is possible to suppress vaporization of refrigerant flowing through the valve 57, and it is possible to supply a sufficient amount of refrigerant to the cooling portion 30, so it is possible to avoid a decrease in cooling performance for cooling the HV device 31, and it is possible to ensure cooling performance for cooling the HV device 31.

Note that, in the above-described selector valve 52, the through-hole 75 extends in the radial direction of the valve element 74, the through-hole 85 extends in the radial direction of the valve element 84, the radial holes 76 and 77 extend in the radial direction of the sleeve portion 72, and the radial holes 86, 87 and 88 extend in the radial direction of the sleeve portion 82; however, the selector valve 52 is not limited to this configuration. The through-hole formed in the valve element 74 may be formed so as to extend in the circumferential direction and/or axial direction of the valve element 74, and the through-hole formed in the valve element 84 may be formed so as to extend in the circumferential direction and/or axial direction of the valve element 84. A flow passage for flowing refrigerant through the through-hole of the valve element 74 may be formed so as to extend in the circumferential direction and/or axial direction of the first housing 71, and a flow passage for flowing refrigerant through the through-hole of the valve element 84 may be formed so as to extend in the circumferential direction and/or axial direction of the second housing 81. For example, a flow passage of refrigerant may be formed in the lid member 73, and a flow passage of refrigerant may be formed in the lid member 83.

In addition, the above-described selector valve 52 is a rotary selector valve that receives the driving force of the motor 61 to rotate the valve element member 64 to thereby switch the open/close states of the valves 57 and 58; however, the selector valve 52 is not limited to this configuration. For example, the selector valve 52 may be a spool-type slide selector valve that axially actuates the valve element member 64 to switch the open/close states of the valves 57 and 58.

Second Embodiment

Figure 12:
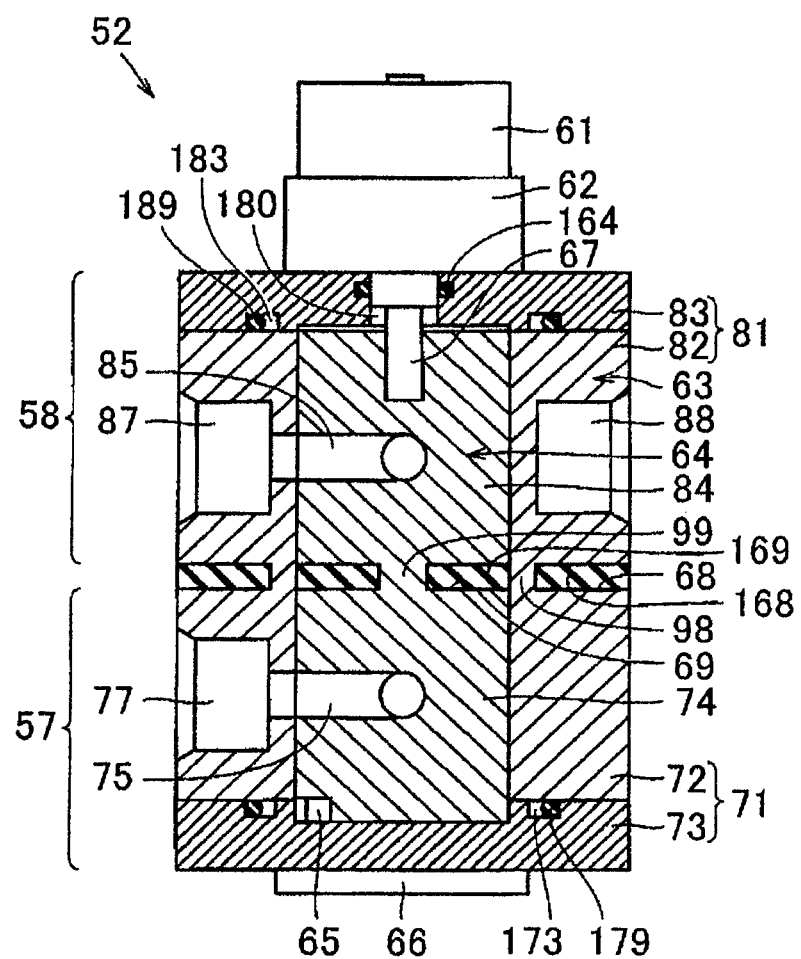
FIG. 12 is a cross-sectional view that shows the details of a selector valve according to a second embodiment.

FIG. 12 is a cross-sectional view that shows the details of a selector valve 52 according to a second embodiment. The selector valve 52 according to the second embodiment differs from the selector valve 52 according to the first embodiment shown in FIG. 3 in that a heat insulating material 169 is provided in the space 69 between the valve elements 74 and 84, a heat insulating material 168 is provided in the space 68 between the sleeve portions 72 and 82 and a heat insulating material providing space is formed between the valve 57 and the valve 58.

That is, the valve element heat insulating unit that suppresses transfer of heat from the valve element 84 to the valve element 74 may be the hollow space 69 or may have a configuration such that the heat insulating material 169 is provided inside the space 69. The housing heat insulating unit that suppresses transfer of heat from the second housing 81 to the first housing 71 may be the hollow space 68 or may have a configuration such that the heat insulating material 168 is provided inside the space 68. By providing the valve element heat insulating unit and the housing heat insulating unit, it is possible to suppress transfer of heat from the valve 58 to the valve 57, and it is possible to suppress vaporization of refrigerant flowing through the valve 57, so it is possible to avoid a decrease in cooling performance for cooling the HV device 31.

The heat insulating material 168 may be any material having a lower thermal conductivity than the housing member 63. The heat insulating material 169 may be any material having a lower thermal conductivity than the valve element member 64. The heat insulating materials 168 and 169 may be a fiber heat insulating material, such as glass wool, a foamed heat insulating material, such as polystyrene foam, or another known heat insulating material.

Third Embodiment

Figure 13:
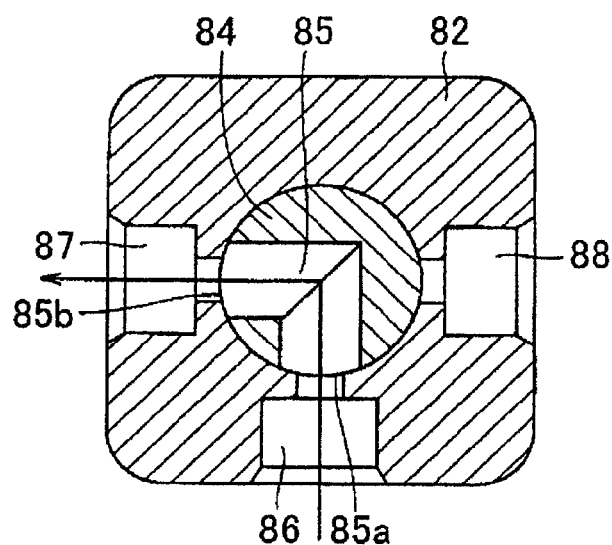
FIG. 13 is a cross-sectional view that shows a selector valve according to a third embodiment.

FIG. 13 is a cross-sectional view that shows a selector valve 52 according to a third embodiment. The selector valve 52 according to the third embodiment differs from that of the first embodiment described with reference to FIG. 7 in that the diameter of the through-hole 85 formed in the valve element 84 is increased.

In the first embodiment, the through-hole 85 is formed such that, at the openings 85a and 85b at which the through-hole 85 is open at the outer periphery of the valve element 84, the diameter of the through-hole 85 is equal to the diameter of each of the radial holes 86 and 87, the diameter of the flow passage of refrigerant flowing from the radial hole 86 to the through-hole 85 does not change and the diameter of the flow passage of refrigerant flowing from the through-hole 85 to the radial hole 87 does not change. In contrast to this, in the third embodiment, the through-hole 85 is formed such that, at the openings 85a and 85b, the through-hole 85 has a larger diameter than the radial holes 86 and 87, the diameter of the flow passage of refrigerant flowing from the radial hole 86 to the through-hole 85 is increased and the diameter of the flow passage of refrigerant flowing from the through-hole 85 to the radial hole 87 is reduced.

Figure 14:
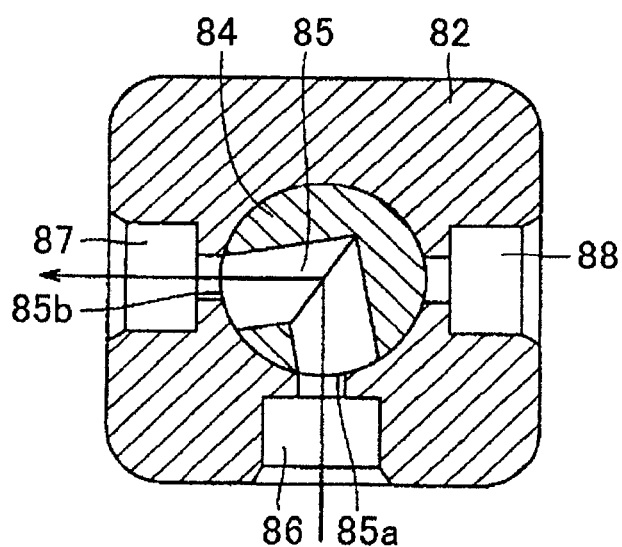
FIG. 14 is a first cross-sectional view of the selector valve according to the third embodiment in a state where the angle of a valve element is changed.
Figure 15:
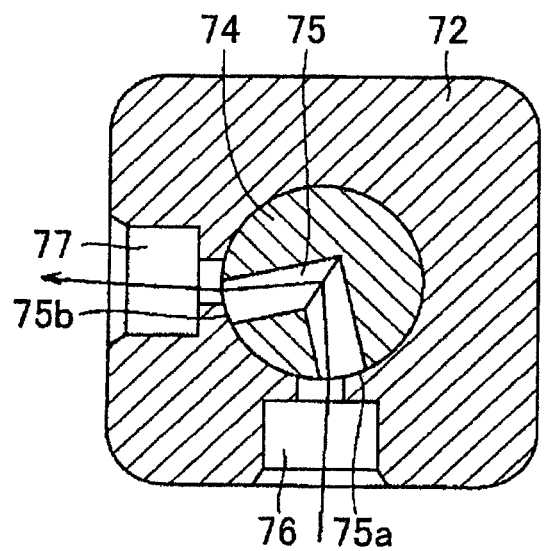
FIG. 15 is a second cross-sectional view of the selector valve according to the third embodiment in a state where the angle of the valve element is changed.

FIG. 14 is a cross-sectional view of the selector valve 52 according to the third embodiment in a state where the angle of the valve element 84 is changed. FIG. 15 is a cross-sectional view of the selector valve 52 according to the third embodiment in a state where the angle of the valve element 74 is changed. FIG. 14 and FIG. 15 show a state where the valve element member 64 is rotated to slightly change the angles of the valve elements 74 and 84 in comparison with FIG. 13. The through-hole 75 according to the third embodiment is formed in the same shape as the through-hole 75 according to the first embodiment, and the through-hole 85 according to the third embodiment is formed to be larger in diameter than the through-hole 85 according to the first embodiment.

Therefore, even when the angle of the valve element 84 is changed, as shown in FIG. 14, flow of refrigerant from the radial hole 86 to the radial hole 87 via the through-hole 85 is not significantly inhibited. On the other hand, by changing the angle of the valve element 74, as shown in FIG. 15, throttles are respectively formed at the inlet and outlet of the through-hole 75, and a pressure loss of refrigerant from the radial hole 76 to the radial hole 77 via the through-hole 75 increases. When the angle of the valve element 74 is adjusted, it is possible to adjust a pressure loss of refrigerant flowing via the valve 57, so it is possible to selectively vary the flow rate of refrigerant flowing via the valve 57.

By so doing, by reducing the flow rate of refrigerant flowing via the valve 57, the flow rate of refrigerant flowing to the cooling portion 30 is increased to thereby make it possible to improve cooling performance for cooling the HV device 31. Alternatively, by increasing the flow rate of refrigerant flowing via the valve 57, the flow rate of refrigerant flowing to the cooling portion 30 is reduced to thereby make it possible to decrease cooling performance for cooling the HV device 31. The amount of refrigerant flowing to the HV device 31 is adjusted using the valves 57 and 58 to thereby make it possible to adjust cooling performance for cooling the HV device 31, so it is possible to optimally cool the HV device 31. In addition, it is possible to reliably reduce pressure loss associated with flow of refrigerant in the cooling system for cooling the HV device 31 and the power consumption of the compressor 12 for circulating refrigerant.

Fourth Embodiment

Figure 16:
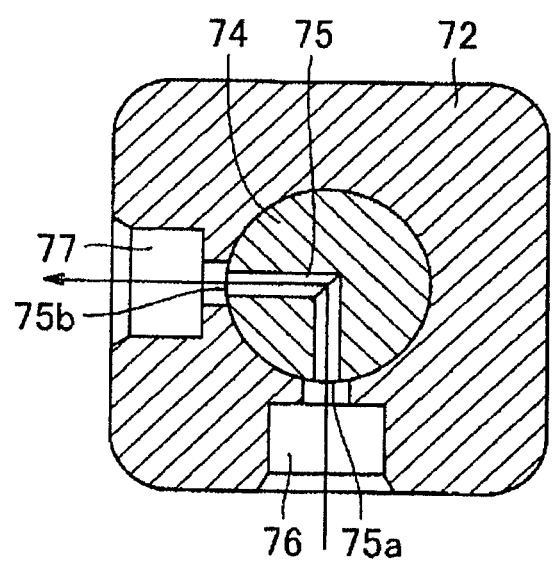
FIG. 16 is a cross-sectional view that shows a selector valve according to a fourth embodiment.

FIG. 16 is a cross-sectional view that shows a selector valve 52 according to a fourth embodiment. The selector valve 52 according to the fourth embodiment differs from that of the first embodiment described with reference to FIG. 8 in that the diameter of the through-hole 75 formed in the valve element 74 is reduced.

In the first embodiment, the through-hole 75 is formed such that, at the openings 75a and 75b at which the through-hole 75 is open at the outer periphery of the valve element 74, the diameter of the through-hole 75 is equal to the diameter of each of the radial holes 76 and 77, the diameter of the flow passage of refrigerant flowing from the radial hole 76 to the through-hole 75 does not change and the diameter of the flow passage of refrigerant flowing from the through-hole 75 to the radial hole 77 does not change. In contrast to this, in the fourth embodiment, the through-hole 75 is formed such that, at the openings 75a and 75b, the through-hole 75 has a smaller diameter than the radial holes 76 and 77, the diameter of the flow passage of refrigerant flowing from the radial hole 76 to the through-hole 75 is reduced and the diameter of the flow passage of refrigerant flowing from the through-hole 75 to the radial hole 77 is increased.

By so doing, the through-hole 75 serves as a fixed throttle provided in the middle of flow of refrigerant via the valve 57. By optimally designing the diameter of the through-hole 75 so as to be able to optimally cool the HV device 31, the flow rate of refrigerant flowing via the valve 57 is set to thereby make it possible to optimally determine a designed value of cooling performance for cooling the HV device 31. A designed value of the diameter of the through-hole 75 may be determined such that power is minimum at an average of all operating conditions of the cooling system 1.

Note that, in the above-described embodiments, the cooling system 1 that cools an electrical device mounted on the vehicle is described using the HV device 31 as an example. The electrical device is not limited to the illustrated electrical devices, such as an inverter and a motor generator. The electrical device may be any electrical device as long as it generates heat when it is operated. In the case where there are a plurality of electrical devices to be cooled, the plurality of electrical devices desirably have a common cooling target temperature range. The target temperature range for cooling is an appropriate temperature range as a temperature environment in which the electrical devices are operated.

In addition, the heat generating source cooled by the cooling system 1 according to the embodiments of the invention is not limited to the electrical device mounted on the vehicle; instead, it may be any device that generates heat or may be a heat generating portion of any device.

Furthermore, the selector valves 52 according to the embodiments of the invention are not limited to valves assembled to the vapor compression refrigeration cycle 10 for switching flow of refrigerant. The selector valves 52 according to the embodiments of the invention may be used to switch flow of selected gas or liquid in any system.

The embodiments of the invention are described above; however, the configurations of the embodiments may be combined where appropriate. In addition, the embodiments described above should be regarded as only illustrative in every respect and not restrictive The scope of the invention is indicated not by the above description but by the appended claims, and is intended to include all modifications within the meaning and scope equivalent to the scope of the appended claims.

The cooling system according to the aspect of the invention may be particularly advantageously applied to cooling of an electrical device, such as a motor generator and an inverter, using a vapor compression refrigeration cycle for cooling a cabin, in a vehicle, such as a hybrid vehicle, a fuel-cell vehicle and an electric vehicle, equipped with the electrical device.

The invention claimed is:

1. A cooling system comprising:
   a compressor configured to circulate refrigerant;
   a first heat exchanger configured to perform heat exchange between the refrigerant and outside air;
   a decompressor configured to decompress the refrigerant;
   a second heat exchanger configured to perform heat exchange between the refrigerant and air-conditioning air;
   a first line and a second line connected in parallel with each other between the first heat exchanger and the decompressor, the first line and the second line being paths of the refrigerant;
   a cooling portion provided on the second line, the cooling portion being configured to use the refrigerant to cool a heat generating source;
   a third line through which the refrigerant flows between the compressor and the first heat exchanger;
   a communication line configured to provide fluid communication between the third line and a portion of the second line, the portion of the second line being closer to the decompressor than the cooling portion; and
   a selector valve connected to the first line, the second line and the communication line, the selector valve including:
   a first valve element having a first through-hole,
   a first housing having a first flow passage through which fluid flowing through the first through-hole passes, the first housing accommodating the first valve element,
   a second valve element having a second through-hole,
   a second housing having a second flow passage through which fluid flowing through the second through-hole passes, the second housing accommodating the second valve element,
   a motor configured to integrally actuate the first valve element and the second valve element,
   a valve element heat insulating unit provided between the first valve element and the second valve element, the valve element heat insulating unit being configured to suppress transfer of heat between the first valve element and the second valve element, and
   a housing heat insulating unit provided between the first housing and the second housing, the housing heat insulating unit being configured to suppress transfer of heat between the first housing and the second housing.

2. The cooling system according to claim 1, wherein:
   the valve element heat insulating unit includes a hollow space formed between the first valve element and the second valve element; and
   the housing heat insulating unit includes a hollow space formed between the first housing and the second housing.

3. The cooling system according to claim 1, wherein the valve element heat insulating unit is a heat insulating material provided in a hollow space between the first valve element and the second valve element.

4. The cooling system according to claim 1, wherein the housing heat insulating unit is a heat insulating material provided in a hollow space between the first housing and the second housing.

5. The cooling system according to claim 1, wherein at least one of the valve element heat insulating unit and the housing heat insulating unit includes a heat insulating material.

6. The cooling system according to claim 1, further comprising:
   a coupling portion coupling the first valve element to the second valve element, the coupling portion having a smaller diameter than the first valve element and the second valve element.

7. The cooling system according to claim 6, wherein the coupling portion has the diameter smaller than or equal to a quarter of the diameter of a smaller one of the first valve element and the second valve element.

8. The cooling system according to claim 1, further comprising:
   a housing coupling portion coupling the first housing to the second housing, the housing coupling portion having an inside diameter equal to an inside diameter of the first housing and an inside diameter of the second housing, and the housing coupling portion having an outside diameter smaller than an outside diameter of the first housing and an outside diameter of the second housing.

9. The cooling system according to claim 8, wherein the housing coupling portion has a radial size that is smaller than or equal to one-fifth of a radial size of a smaller one of the first housing and the second housing.

* * * * *